US008351311B2

(12) United States Patent  
Matsuda et al.

(10) Patent No.: US 8,351,311 B2  
(45) Date of Patent: Jan. 8, 2013

(54) SEMICONDUCTOR INTEGRATED CIRCUIT AND OPTICAL DISK DEVICE HAVING THE SAME

(75) Inventors: Toshiya Matsuda, Kanagawa (JP); Hiroshi Ide, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 0 days.

(21) Appl. No.: 13/094,569

(22) Filed: Apr. 26, 2011

(65) Prior Publication Data

US 2011/0261661 A1   Oct. 27, 2011

(30) Foreign Application Priority Data

Apr. 26, 2010 (JP) ................. 2010-101024

(51) Int. Cl.  
*G11B 7/00* (2006.01)

(52) U.S. Cl. ............. 369/44.41; 369/44.27; 369/53.2; 369/53.37; 369/59.21; 369/44.34

(58) Field of Classification Search .............. 369/44.26, 369/44.27, 44.29, 44.34, 44.41, 53.2, 53.28, 369/53.37, 51.16, 59.21, 44.32, 124.12  
See application file for complete search history.

(56) References Cited

U.S. PATENT DOCUMENTS

| 2002/0024898 A1* | 2/2002 | Kamiyama ................. 369/44.28 |
| 2002/0196717 A1* | 12/2002 | Masui et al. ................ 369/44.29 |
| 2005/0276199 A1* | 12/2005 | Sugai .......................... 369/53.2 |
| 2006/0109770 A1* | 5/2006 | Ogura et al. ................. 369/116 |
| 2007/0064559 A1* | 3/2007 | Wada .......................... 369/47.28 |
| 2009/0010129 A1* | 1/2009 | Ishibashi et al. ............ 369/53.23 |
| 2009/0252010 A1* | 10/2009 | Bakx et al. ................. 369/53.17 |
| 2010/0149940 A1* | 6/2010 | Nakata et al. .............. 369/53.34 |

FOREIGN PATENT DOCUMENTS

| JP | 2006-48841 A | 2/2006 |
| JP | 2006-59447 A | 3/2006 |
| JP | 2007-18640 A | 1/2007 |
| JP | 2007-184049 A | 7/2007 |

* cited by examiner

*Primary Examiner* — Thang Tran  
(74) *Attorney, Agent, or Firm* — Miles and Stockbridge P.C.

(57) ABSTRACT

The present invention achieves higher precision and lower power consumption by reducing semiconductor chip occupation area. A semiconductor integrated circuit which can be mounted on an optical disk device has: a wobble signal generating circuit capable of receiving first, second, third, and fourth light reception output signals A, B, C, and D of a light receiving element in an optical pickup and detecting a wobble in a recordable disk; a differential phase detection signal (DPD) generating circuit for tracking an unrecordable disk; and two A/D converters and an arithmetic circuit. The first, second, third, and fourth light reception output signals are selectively supplied to the two A/D converters, the arithmetic circuit in a first operation mode generates a first addition output signal of A and C and a second addition output signal of B and D, the DPD generating circuit generates a digital phase comparison signal, the arithmetic circuit in a second operation mode generates a third addition output signal of A and D and a fourth addition output signal of B and C, and the wobble signal generating circuit generates a digital wobble signal.

20 Claims, 10 Drawing Sheets

SEMICONDUCTOR INTEGRATED CIRCUIT AND OPTICAL DISK DEVICE HAVING THE SAME

CROSS-REFERENCE TO RELATED APPLICATIONS

The disclosure of Japanese Patent Application No. 2010-101024 filed on Apr. 26, 2010 including the specification, drawings and abstract is incorporated herein by reference in its entirety.

BACKGROUND

The present invention relates to a semiconductor integrated circuit and an optical disk device having the same and, more particularly, to a technique effective to achieve higher precision and lower consumption power by reducing a semiconductor chip occupation area.

An optical disk is diversified to a CD (Compact Disk), a DVD (Digital Versatile Disk), a BD (Blue-Ray Disk), and the like, and the system configuration of an optical disk drive for recording/reproducing an optical disk is complicated. A semiconductor integrated circuit mounted on an optical disk device is requested to achieve lower cost and lower power consumption and, on the other hand, has to record/reproduce data to/from the diversified disks.

A semiconductor integrated circuit mounted on an optical disk drive has therein a servo error signal generating circuit for generating a servo error signal of tracking servo and focus servo from an electric signal output from an optical disk pickup light receiving element and a wobble signal generating circuit for generating a wobble signal used at timings of physical address information on an optical disk, disk rotation control, and recording data from the electric signal.

In the case of reproducing information on an optical disk, it is necessary to control track servo (tracking servo) for making an optical beam emitted from a semiconductor laser light emitting device follow a predetermined track in an optical disk, focus servo for making a focal point match on the recording face of the optical disk, speed servo for controlling the rotational speed of the optical disk, and the like.

For the tracking error signal, two kinds of methods exist. The first method is a differential phase detection (DPD) method for reproduction recommended in the standards of BD-ROM and DVD-ROM, and the second one is a differential push-pull (DPP) method used for recording in an optical disk device and reproduction of a disk such as a CD-ROM. Particularly, the differential phase detection (DPD) method is a detection method recommended in the standards of disks in which reproduction data is already written and to which data cannot be recorded such as a BD-ROM and a DVD-ROM. The method performs detection on the basis of high-frequency reproduction data on a disk, so that the semiconductor integrated circuit is required to perform high-speed signal process.

The following patent document 1 discloses a DPD signal generating apparatus using output signals of four regions A, B, C, and D of a light receiving element divided by the track direction axis and the orthogonal axis direction of an optical disk. A first phase comparator detects the phase difference between a binary signal of the region A and a binary signal of the region B, and a second phase comparator detects the phase difference between a binary signal of the region C and a binary signal of the region D. A detection result of the first phase comparator and a detection result of the second phase comparator are added by an addition circuit, and an addition result is supplied to a servo controller via a low-pass filter.

The following patent document 2 discloses a tracking error detection circuit by the DPD method using output signals of four divided regions A, B, C, and D of a light receiving element of an optical disk. A signal from the region A and a signal from the region C are added by a first addition circuit, and a signal from the region B and a signal from the region D are added by a second addition circuit. The first addition output signal of the first adding circuit and the second addition output signal of the second adding circuit are supplied to a first level comparator circuit and a second level comparator circuit via a first equalizer circuit and a second equalizer circuit, respectively. A first binary signal of the first level comparator circuit and a second binary signal of the second level comparator circuit are supplied to a phase comparing circuit. First and second comparison output signals of the phase comparing circuit are supplied to a subtraction circuit via first and second low-pass filters, respectively, and a tracking error signal is generated from an output of the subtraction circuit.

On the other hand, in the CD-R (Recordable), CD-RW (Rewritable), DVD-R, DVD-RW, DVD-RAM, BD-R1, BD-RE, and the like as recordable optical disks, a format for wobbling a track in order to accurately detect linear velocity in each of radius positions is employed. By detecting a wobble signal of a track, detection of physical address of the optical disk, rotation control of the optical disk, recording data timing control, and the like can be performed.

The following patent document 3 discloses a wobble signal extracting circuit using output signals of the four regions A, B, C, and D of a light receiving element. A first variable gain amplifying circuit adds signals of regions A and D to generate a first arithmetic result A+D, and a second variable gain amplifying circuit adds signals of regions B and C to generate a second arithmetic result B+C. The first arithmetic result A+D and the second arithmetic result B+C are supplied to the subtraction circuit via a first automatic gain control circuit and a second automatic gain control circuit, respectively. The subtraction circuit generates a wobble signal W by executing the arithmetic operation (A+D)−(B+C).

The following patent document 4 discloses a wobble detecting circuit for executing the analog arithmetic operation of (A+D)−(B+C) described in the patent document 3 by digital arithmetic process. Two analog addition signals are supplied to two high-speed sampling circuits via two binarizing circuits, a digital subtraction signal of the high-speed sampling circuits is supplied to a digital filter, and the digital wobble signal is supplied to a digital wobble detector.

RELATED ART DOCUMENT

Patent Document

Patent document 1: Japanese Unexamined Patent Publication No. 2007-018640
Patent document 2: Japanese Unexamined Patent Publication No. 2007-184049
Patent document 3: Japanese Unexamined Patent Publication No. 2006-059447
Patent document 4: Japanese Unexamined Patent Publication No. 2006-048841

SUMMARY

Prior to the present invention, the inventors of the present invention have engaged in research and development of a semiconductor integrated circuit which can be mounted on an optical disk device.

FIG. 1 is a diagram showing the configuration of a semiconductor integrated circuit which can be mounted on an optical disk device examined by the inventors of the present invention prior to the present invention.

A semiconductor integrated circuit LSI shown in FIG. 1 can be coupled to an optical pickup PU mounted on an optical disk device. In the optical pickup PU, RF read differential signals 23a and 23b of a data read light receiving element from recording pits on a track of an optical disk are generated, output signals 1a, 1b, 1c, and 1d of four regions A, B, C, and D of a main light receiving element are also generated for tracking servo, focus servo, and wobble detection, and output signals 1e, 1f, 1g, and 1h of four regions E, F, G, and H of a sub light receiving element are generated.

In the optical pickup PU, the border line between the regions A and D and the regions B and C of the main light receiving element is a track direction axis of the optical disk, and the border line between the regions A and B and the regions C and D of the main light receiving element is an orthogonal axis direction. The sub light receiving element in the optical pickup PU can be configured by two light receiving elements. The forward sub light receiving element is disposed in front of the main light receiving element in the track direction, and the rearward sub light receiving element is disposed behind the main light receiving element in the track direction. By arithmetic process on four output signals from the forward sub light receiving element and four output signals from the rearward sub light receiving element, output signals 1e, 1f, 1g, and 1h of the four regions E, F, G, and H of the sub light receiving element can be generated.

The optical pickup PU also includes a semiconductor laser light emitting element for recording/reproducing information to/from an optical disk. Therefore, the optical pickup PU includes a laser controller 22 for controlling recording power at the time of recording information to an optical disk and reproduction power at the time of reproducing information from an optical disk. On the other hand, the semiconductor integrated circuit LSI includes a recording power control circuit 20 for controlling the recording power of the laser controller 22 in the optical pickup PU and a reproduction power control circuit 21 for controlling the reproduction power of the laser controller 22 in the optical pickup PU.

The semiconductor integrated circuit LSI also includes an amplitude converting circuit 2, an A/D converter 3, an amplitude detecting circuit 4, a wobble signal generating circuit 5, an A/D converter 6, a wobble signal processor 7, a recording signal processor 8, a rotation control circuit 9, a DPD signal generating circuit 10, an A/D converter 11, offset cancel amplifiers 12a to 12d and 12e to 12h, an A/D converter 13, a tracking servo method selecting circuit 14, a tracking servo error generating circuit 15, a focus servo error generating circuit 16, a servo signal processor 17, D/A converters 18 and 19, an RF generating circuit 24, an A/D converter 25, a reproduction signal processor 26, a central processing unit (CPU) 27, and a memory 28.

The output signals 1a, 1b, 1c, and 1d from the four regions A, B, C, and D of the main light receiving element are supplied to the amplitude correcting circuit 2, the wobble signal generating circuit 5, the DPD signal generating circuit 10, and the offset cancel amplifiers 12a, 12b, 12c, and 12d, and the output signals 1e, 1f, 1g, and 1h from the four regions E, F, G, and H of the sub light receiving element are supplied to the offset cancel amplifiers 12e, 12f, 12g, and 12h.

An output signal of the amplitude correcting circuit 2 is supplied to the input terminal of the A/D converter 3, an output signal of the A/D converter 3 is supplied to the input terminal of the amplitude detecting circuit 4, and an output signal of the amplitude detecting circuit 4 is supplied to the servo signal processor 17 and the reproduction signal processor 26. An output signal of the wobble signal generating circuit 5 is supplied to the input terminal of the A/D converter 6, an output signal of the A/D converter 6 is supplied to the input terminal of the wobble signal processor 7, and an output signal of the wobble signal processor 7 is supplied to the recording signal processor 8 and the rotation control circuit 9. An output signal of the DPD signal generating circuit 10 is supplied to the input terminal of the A/D converter 11, and an output signal of the A/D converter 11 is supplied to one of the input terminals of the tracking servo method selecting circuit 14.

Output signals of the offset cancel amplifiers 12a to 12d and 12e to 12h are supplied to the input terminal of the A/D converter 13, and an output signal of the A/D converter 13 is supplied to the other input terminal of the tracking servo method selecting circuit 14 and the input terminal of the focus servo error generating circuit 16.

An output signal of the tracking servo method selecting circuit 14 is supplied to the input terminal of the tracking servo error generating circuit 15, an output signal of the tracking servo error generating circuit 15 is supplied to one of the input terminals of the servo signal processor 17, and an output signal of the focus servo error generating circuit 16 is supplied to the other input terminal of the servo signal processor 17. A digital tracking signal generated from the servo signal processor 17 is converted to an analog signal by the D/A converter 18, and an analog tracking signal is supplied to a thread motor driving circuit for driving a thread motor for moving the optical pickup PU in the orthogonal axis direction. A digital focus signal generated from the servo signal processor 17 is converted to an analog signal by the D/A converter 18, and the analog focus signal is supplied to a focus control driving circuit for adjusting the focal point to the recording face of an optical disk. A digital rotation control signal generated from the rotation control circuit 9 is converted to an analog signal by the another D/A converter 19, and an analog rotation control signal is supplied to a spindle motor driving circuit for driving a spindle motor that rotates an optical disk. A digital rotation control signal generated from the rotation control circuit 9 is supplied as it is in the digital signal form to a spindle motor driving circuit for driving a spindle motor that rotates an optical disk.

An analog reproduction read signal generated from the RF generating circuit 24 is converted to a digital signal by the A/D converter 25, and the digital reproduction read signal is supplied to the reproduction signal processor 26. The reproduction signal processor 26 includes a PLL for extracting a reproduction clock signal and reproduction data from the digital reproduction read signal by executing clock data recovery by the digital signal process. Digital reproduction signals generated by waveform equalizing process, Viterbi signal process, demodulating process, error correcting process, and the like in the reproduction signal processor 26 are supplied to, for example, a host device such as a personal computer. The central processing unit (CPU) 27 executes the general control of an element circuit included in the semiconductor integrated circuit LSI by using an optical disk device control program stored in the memory 28.

The amplitude correcting circuit 2 executes addition of A+B+C+D of the output signals 1a, 1b, 1c, and 1d from the four regions A, B, C, and D of the main light receiving element and amplitude correction. The resultant signals are converted to digital signals by the A/D converter 3, and the digital amplitude is detected by the amplitude detecting circuit 4. For example, when there is a scratch in an optical disk, information of small amplitude is generated from the amplitude detecting circuit 4. When there is a scratch in an optical disk, a detection signal indicative of the existence of the scratch is supplied from the amplitude detecting circuit 4 to the reproduction signal processor 26.

Depending on the specifications of the optical pickup PU, the focus servo error generating circuit 16 executes either computation of (A+C)−(B+D) or computation of (A+C)−(B+D)+α{(E+G)−(F+H)} by using an output signal of the A/D converter 13 to which output signals of the offset cancel amplifiers 12a to 12d and 12e to 12h are supplied. α denotes a coefficient determined by the specifications of the optical pickup PU.

FIG. 3 is a diagram showing the configuration of the wobble signal generating circuit 5 included in the semiconductor integrated circuit LSI examined by the inventors of the present invention prior to the present invention illustrated in FIG. 1.

As shown in FIG. 3, the wobble signal generating circuit 5 includes a first amplification arithmetic circuit 58a, a second amplification arithmetic circuit 58b, a first AGC circuit 59a, a second AGC circuit 59b, a subtraction circuit 60, a third AGC circuit 62, and a filter circuit 63.

By the supply of the output signals 1a and 1d from the two regions A and D in the main light receiving element to the two input terminals of the first amplification arithmetic circuit 58a, a first addition signal 58c (A+D) is generated from the output terminal of the first amplification arithmetic circuit 58a. On the other hand, by the supply of the output signals 1b and 1c from the two regions B and C in the main light receiving element to the two input terminals of the second amplification arithmetic circuit 58b, a second addition signal 58d (B+C) is generated from the output terminal of the second amplification arithmetic circuit 58b.

The first AGC circuit 59a executes the amplitude control on the first addition signal (A+D), and the second AGC circuit 59b executes the amplitude control on the second addition signal (B+C). Therefore, when a first amplitude control addition signal 59c (A+D) and a second amplitude control addition signal 59d (B+C) are supplied to the two input terminals of the subtraction circuit 60, a wobble signal component having a difference signal 61 (A+D)−(B+C) is generated from the output terminal of the subtraction circuit 60. The wobble signal component is supplied to the wobble signal processor 7 shown in FIG. 1 via the third AGC circuit 62, the filter circuit 63, and the A/D converter 6 illustrated in FIG. 1.

FIG. 4 is a diagram showing the configuration of the DPD signal generating circuit 10 of the differential phase detection (DPD) method included in the semiconductor integrated circuit LSI examined by the inventors of the present invention prior to the present invention illustrated in FIG. 1.

As shown in FIG. 4, the DPD signal generating circuit 10 includes first, second, third, and fourth amplification circuits 65a, 65b, 65c, and 65d, first, second, third, and fourth binarizing circuits 66a, 66b, 66c, and 66d, first and second phase comparing circuits 67a and 67b, an adding circuit 68, and a filter circuit 70.

The output signals 1a, 1b, 1c, and 1d from the four regions A, B, C, and D of the main light receiving element are amplified by the first, second, third, and fourth amplification circuits 65a, 65b, 65c, and 65d, respectively, and the resultant amplified signals are supplied to the input terminals of the first, second, third, and fourth binarizing circuits 66a, 66b, 66c, and 66d. When an output signal of the first binarizing circuit 66a and an output signal of the second binarizing circuit 66b are supplied to two input terminals of the first phase comparing circuit 67a, a first phase comparison signal 67c (A, B) is generated from the output terminal of the first phase comparing circuit 67a. On the other hand, when an output signal of the third binarizing circuit 66c and an output signal of the fourth binarizing circuit 66d are supplied to two input terminals of the second phase comparing circuit 67b, a second phase comparison signal 67d (C, D) is generated from the output terminal of the second phase comparing circuit 67b. When the first phase comparison signal 67c (A, B) of the first phase comparing circuit 67a and the second phase comparison signal 67d (C, D) of the second phase comparing circuit 67b are supplied to the two input terminals of the addition circuit 68, an addition output signal 69 (A,B)+(C,D) is generated from the output terminal of the adding circuit 68. The addition output signal 69 is supplied to the tracking servo method selecting circuit 14 shown in FIG. 1 via the filter circuit 70 and the A/D converter 11 shown in FIG. 1.

FIG. 5 is a diagram showing the configuration of another DPD signal generating circuit 10 of the differential phase detection (DPD) method included in the semiconductor integrated circuit LSI examined by the inventors of the present invention prior to the present invention illustrated in FIG. 1.

As shown in FIG. 5, the another DPD signal generating circuit 10 includes a first adding circuit 72a, a second adding circuit 72b, a first amplifying circuit 73a, a second amplifying circuit 73b, a first binarizing circuit 74a, a second binarizing circuit 74b, a phase comparing circuit 75, and a filter circuit 76.

When the output signals 1a and 1c from the two regions A and C in the main light receiving element are supplied to the two input terminals of the first adding circuit 72a, a first addition signal 72a (A+C) is generated from the output terminal of the first addition circuit 72a. On the other hand, when the output signals 1b and 1d from the two regions B and D in the main light receiving element are supplied to the two input terminals of the second adding circuit 72b, a second addition signal 72b (B+D) is generated from the output terminal of the second adding circuit 72b. The first addition signal 72a (A+C) and the second addition signal 72b (B+D) are amplified by the first amplifying circuit 73a and the second amplifying circuit 73b, respectively, and after that, the amplified signals are supplied to the input terminal of the first binarizing circuit 74a and the input terminal of the second binarizing circuit 74b. When an output signal of the first binarizing circuit 74a and an output signal of the second binarizing circuit 74b are supplied to two input terminals of the phase comparing circuit 75, a phase comparison signal (A+C), (B+D) is generated from the output terminal of the phase comparing circuit 75. The phase comparison signal is supplied to the tracking servo method selecting circuit 14 shown in FIG. 1 via the filter circuit 76 and the A/D converter 11 shown in FIG. 1.

However, the examination made by the inventors of the present invention prior to the present invention reveals a problem that since the amplitude detecting circuit 4, the wobble signal generating circuit 5, and the DPD signal generating circuit 10 in the semiconductor integrated circuit LSI shown in FIG. 1 are configured by analog circuits formed in the semiconductor integrated circuit LSI, the semiconductor chip occupation area of the analog circuits is large and the manufacture cost is high. Further, since it is difficult to increase the precision of the analog circuits, problems such that the manufacture yield of the semiconductor integrated circuit LSI is low, and the manufacture cost is high are clarified. On the basis of the result of such examination, prior to the present invention, the inventors of the present invention have examined to digitize the amplitude detecting circuit, the wobble signal generating circuit, and the DPD signal generating circuit in order to realize reduction in the semiconductor chip occupation area and higher precision.

FIG. 2 is a diagram also showing the configuration of a semiconductor integrated circuit which can be mounted on an optical disk device examined by the inventors of the present invention prior to the present invention.

The semiconductor integrated circuit LSI shown in FIG. 2 includes, different from the semiconductor integrated circuit LSI shown in FIG. 1, an amplitude correcting circuit 32, a wobble signal generating circuit 33, and a DPD signal generating circuit 34 as digital circuits. Therefore, to address the digitalization, the semiconductor integrated circuit LSI shown in FIG. 2 includes four A/D converters 31a, 31b, 31c, and 31d coupled between the offset cancel amplifiers 12a to 12d and the amplitude correcting circuit 32, the wobble signal generating circuit 33, the DPD signal generating circuit 34, and an interface circuit 35. An A/D converter 36 coupled to the offset cancel amplifiers 12e to 12h supplies, as digital signals, the output signals 1e, 1f, 1g, and 1h from the four regions, E, F, G, and H of the sub light receiving element in order to generate a focus servo error signal to the focus servo error generating circuit 16 via the interface circuit 35. As a result, computation of (A+C)−(B+D)+α{(E+G)−(F+H)} by the focus servo error generating circuit 16 can be executed. The A/D converter 36 coupled to the offset cancel amplifiers 12e to 12h supplies, as digital signals, output signals 1e, 1f, 1g, and 1h from the four regions E, F, G, and H of the sub light receiving element for the differential push pull (DPP) method in generation of a tracking servo error signal used for recording an optical disk device and reproduction of a disk such as a CD-ROM to the tracking servo error generating circuit 15 via the interface circuit 35. As a result, computation of (A+D)−(B+C)−α{(E+H)−(F+G)} by the tracking servo error generating circuit 15 can be executed. The other configuration of the semiconductor integrated circuit LSI shown in FIG. 2 is the same as that of the semiconductor integrated circuit LSI shown in FIG. 1, so that the description will not be repeated.

FIG. 6 is a diagram for explaining the operation of A/D conversion parallel process performed by the four A/D converters 31a to 31d included in the semiconductor integrated circuit LSI examined by the inventors of the present invention prior to the present invention shown in FIG. 2.

As shown in FIG. 6, the four A/D converters 31a to 31d convert analog output signals from the four regions A, B, C, and D of the main light receiving element supplied via the offset cancel amplifiers 12a to 12d to digital signals at the same timings 78a to 78h. In particular, the wobble signal generating circuit 33 has to process an input signal having a considerably high frequency of about 100 MHz, so that the four A/D converters 31a to 31d coupled to the input terminal of the wobble signal generating circuit 33 have to be configured by high-speed A/D converters. Therefore, a problem such that the power consumption of the four high-speed A/D converters 31a to 31d is high and the circuit scale is also large was clarified.

The present invention has been achieved as a result of examinations of the inventors of the present invention prior to the present invention.

Therefore, an object of the present invention is to reduce semiconductor chip occupation area in a semiconductor integrated circuit which can be mounted on an optical disk device and to achieve higher precision and lower power consumption.

The above and other objects and novel features of the present invention will become apparent from the description of the specification and the appended drawings.

Representative ones of inventions disclosed in the present application will be briefly described as follows.

That is, a representative embodiment of the present invention relates to a semiconductor integrated circuit (LSI) which can be mounted on an optical disk device having an optical pickup (PU).

The semiconductor integrated circuit (LSI) receives first, second, third, and fourth light reception output signals (A, B, C, and D) from four light reception regions in a light receiving element in the optical pickup (PU).

The semiconductor integrated circuit (LSI) has a wobble signal generating circuit (33) capable of detecting a wobble in a recordable disk, a differential phase detecting method signal generating circuit (34) for tracking an unrecordable disk, two A/D converters (42a, 42b), and an arithmetic circuit (41, 44).

To the two A/D converters (42a, 42b), the first, second, third, and fourth light reception output signals (A, B, C, and D) are selectively supplied.

When the arithmetic circuit (41, 44) is set in a first operation mode, the arithmetic circuit generates a first addition output signal (A+C) of the first light reception output signal (A) and the third light reception output signal (C) and a second addition output signal (B+D) of the second light reception output signal (B) and the fourth light reception output signal (D).

When the arithmetic circuit (41, 44) is set in a second operation mode, the arithmetic circuit generates a third addition output signal (A+D) of the first light reception output signal (A) and the fourth light reception output signal (D) and a fourth addition output signal (B+C) of the second light reception output signal (B) and the third light reception output signal (C).

The wobble signal generating circuit (33) generates a digital wobble signal by execution of digital subtraction operation (A+D)−(B+C) using the third addition output signal (A+D) and the fourth addition output signal (B+C) generated on the basis of arithmetic operation of the arithmetic circuit (41, 44) which is set in the second operation mode.

The differential phase detection method signal generating circuit (34) generates a digital phase comparison signal ((A+C), (B+D)) using the first addition output signal (A+C) and the second addition output signal (B+D) generated on the basis of arithmetic operation of the arithmetic circuit (41, 44) which is set in the first operation mode (refer to FIGS. 7 and 12).

Effects obtained by the representative ones of the inventions disclosed in the present application will be briefly described as follows.

According to the present invention, the semiconductor chip occupation area is reduced, and higher precision and lower power consumption can be achieved.

DETAILED DESCRIPTION

1. Summary of Embodiments

Figure 1:
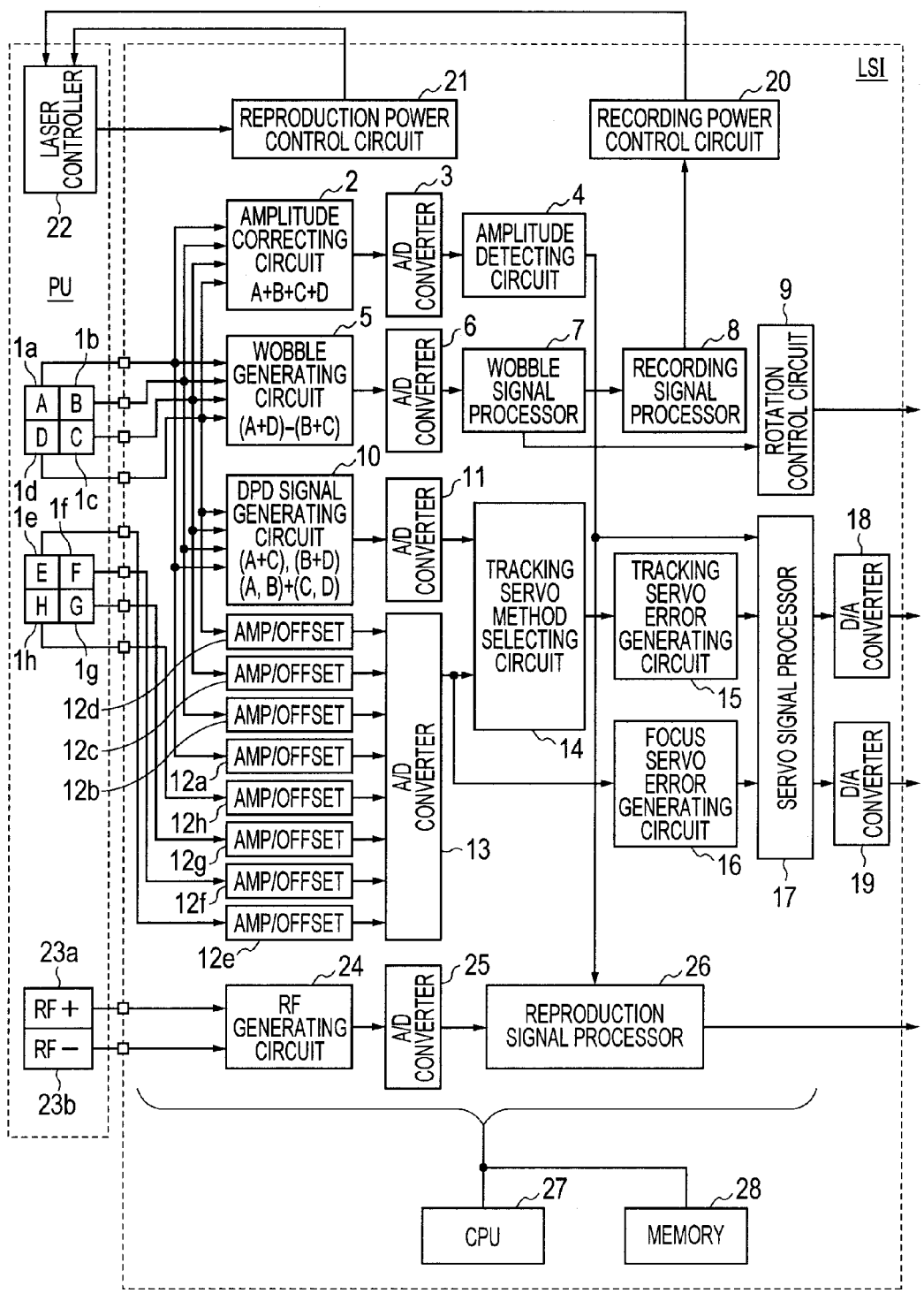
FIG. 1 is a diagram showing the configuration of a semiconductor integrated circuit which can be mounted on an optical disk device examined by the inventors of the present invention prior to the present invention.

First, summary of representative embodiments of the present invention disclosed in the present application will be described. Reference numerals of drawings which are referred to in parentheses in the brief description of the representative embodiments just illustrate components included in the concept of the components to which the reference numerals are designated.

[1] A representative embodiment of the present invention relates to a semiconductor integrated circuit (LSI) which can be mounted on an optical disk device having an optical pickup (PU).

The semiconductor integrated circuit (LSI) can receive first, second, third, and fourth light reception output signals (A), (B), (C), and (D) from four light receiving regions of a light receiving element of the optical pickup (PU).

The semiconductor integrated circuit (LSI) includes a wobble signal generating circuit (33) capable of detecting a wobble in a recordable disk which is inserted in the optical disk device and a differential phase detecting method signal generating circuit (34) for tracking an unrecordable disk which is inserted in the optical disk device.

The semiconductor integrated circuit (LSI) further includes a cascade coupling of two A/D converters (42a and 42b) and arithmetic circuits (41, 44).

To the two A/D converters (42a, 42b), the first, second, third, and fourth light reception output signals (A), (B), (C), and (D) which are output from the light receiving element can be selectively supplied.

When a first operation mode is set, the arithmetic circuit (41, 44) can generate a first addition output signal (A+C) of the first light reception output signal (A) and the third light reception output signal (C) and a second addition output signal (B+D) of the second light reception output signal (B) and the fourth light reception output signal (D).

When a second operation mode is set, the arithmetic circuit (41, 44) can generate a third addition output signal (A+D) of the first light reception output signal (A) and the fourth light reception output signal (D) and a fourth addition output signal (B+C) of the second light reception output signal (B) and the third light reception output signal (C).

The wobble signal generating circuit (33) generates a digital wobble signal by execution of digital subtraction operation (A+D)−(B+C) using the third addition output signal (A+D) and the fourth addition output signal (B+C) generated on the basis of arithmetic operation of the arithmetic circuit (41, 44) which is set in the second operation mode.

Figure 7:
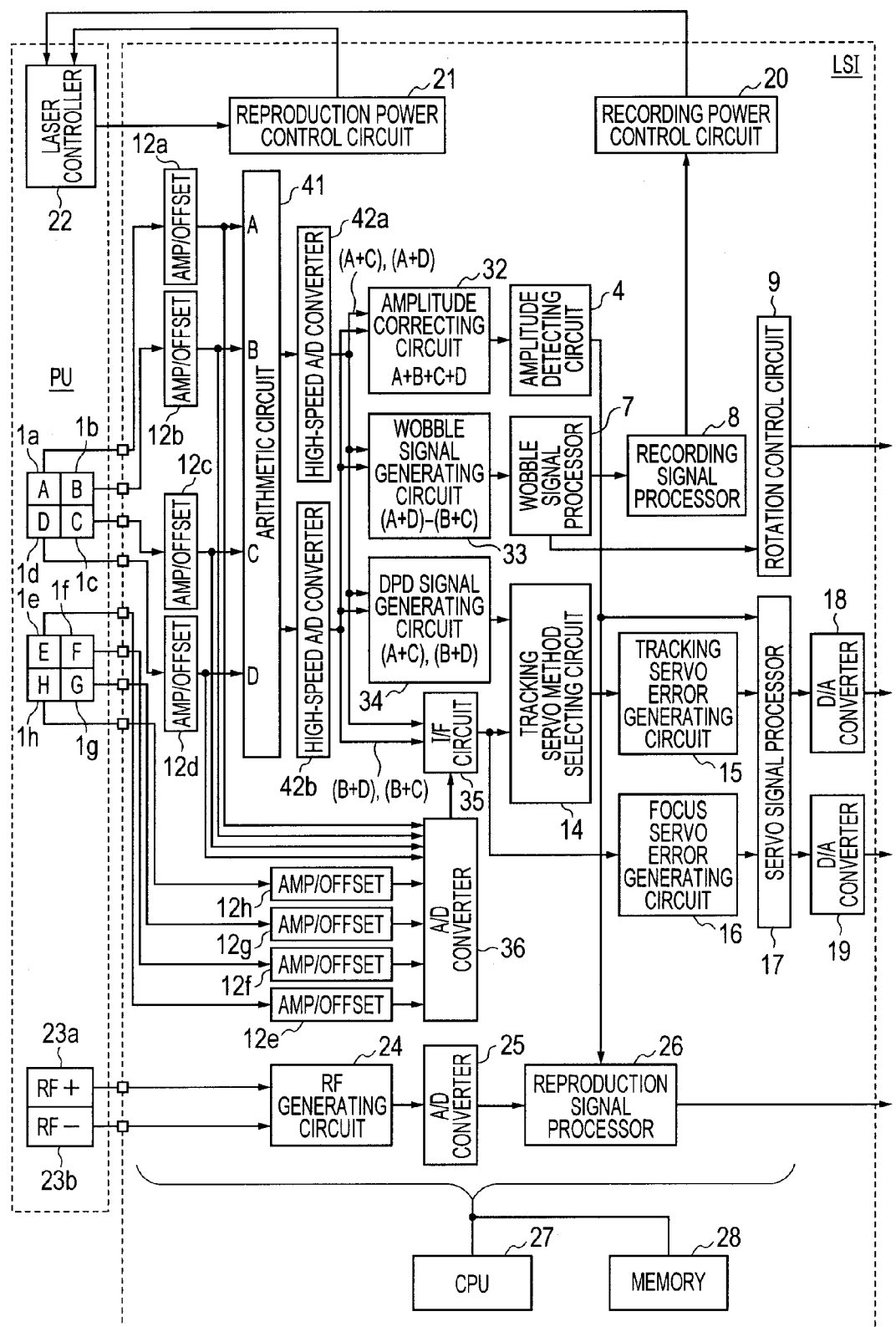
FIG. 7 is a diagram illustrating the configuration of a semiconductor integrated circuit according to a first embodiment of the invention which can be mounted on an optical disk device.
Figure 12:
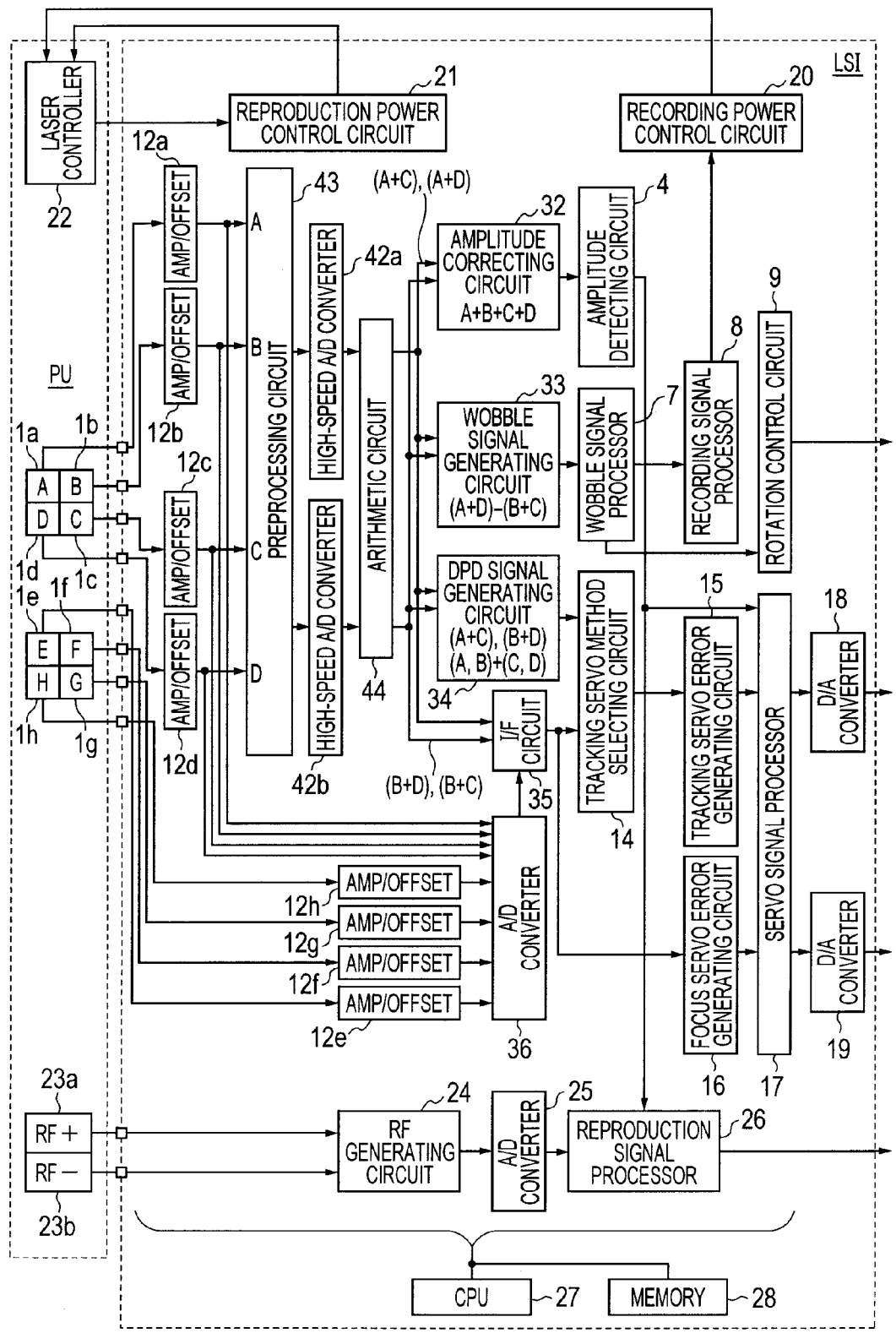
FIG. 12 is a diagram showing the configuration of a semiconductor integrated circuit according to second and third embodiments of the present invention, which can be mounted on an optical disk device.

The differential phase detection method signal generating circuit (34) generates a digital phase comparison signal ((A+C), (B+D)) using the first addition output signal (A+C) and the second addition output signal (B+D) generated on the basis of arithmetic operation of the arithmetic circuit (41, 44) which is set in the first operation mode (refer to FIGS. 7 and 12).

According to the embodiment, the semiconductor chip occupation area is reduced, thereby achieving higher precision and lower power consumption.

The semiconductor integrated circuit (LSI) according to a preferred embodiment further includes an amplitude correction detecting circuit (32, 4) capable of generating a detection signal indicative of the existence of a scratch in the recordable disk and a scratch in the unrecordable disk by executing both of first digital addition operation (A+C)+(B+D) using the first addition output signal (A+C) and the second addition output signal (B+D) generated on the basis of the arithmetic operation of the arithmetic circuit (41, 44) which is set in the first operation mode and second digital addition operation (A+D)+(B+C) using the third addition output signal (A+D) and the fourth addition output signal (B+C) generated on the basis of the arithmetic operation of the arithmetic circuit (41, 44) which is set in the second operation mode (refer to FIGS. 7 and 12).

Figure 11:
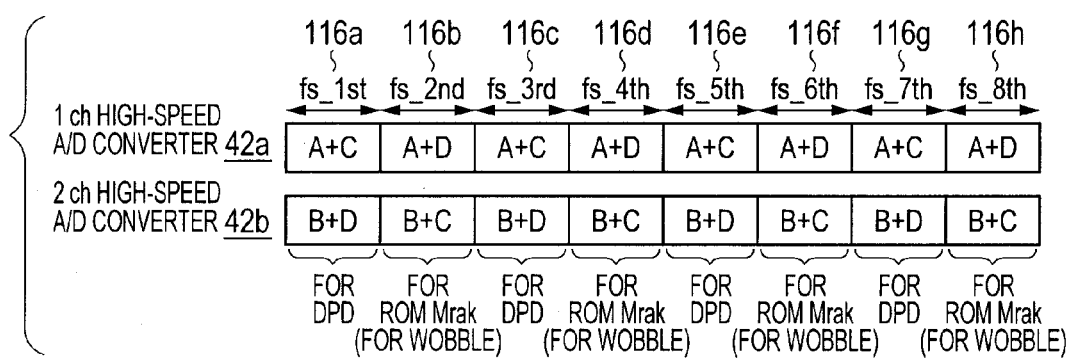
FIG. 11 is a diagram for explaining the operation of first and second high-speed A/D converters 42a and 42b when the DPD generating operation by the DPD signal generating circuit 34 and the ROM mark detecting operation by the wobble signal generating circuit 33 are executed while being alternately serially switched in the semiconductor integrated circuit LSI according to the first embodiment of the invention shown in FIG. 7.

According to another preferred embodiment, in the case where a read-only BD-ROM disk is inserted in the optical disk device, to detect a ROM mark recorded on the BD-ROM disk, generation of the digital phase comparison signal ((A+C), (B+D)) by the differential phase detection method signal generating circuit (34) using the first addition output signal (A+C) and the second addition output signal (B+D) generated on the basis of the arithmetic operation of the arithmetic circuit (41, 44) which is set in the first operation mode for tracking error signal detection on the BD-ROM disk and detection of the ROM mark by executing the digital subtraction operation (A+D)−(B+C) by the wobble signal generating circuit (33) using the third addition output signal (A+D) and the fourth addition output signal (B+C) generated on the basis of the arithmetic operation of the arithmetic circuit (41, 44) which is set in the second operation mode are alternately executed (refer to FIG. 11).

According to a more preferred embodiment, when the arithmetic circuit (41) is set in the first operation mode, the arithmetic circuit (41) can generate the first addition output signal (A+C) by first analog addition of the first light reception output signal (A) and the third light reception output signal (C) and the second addition output signal (B+D) by second analog addition of the second light reception output signal (B) and the fourth light reception output signal (D).

When the arithmetic circuit (41) is set in the second operation mode, the arithmetic circuit (41) can generate the third addition output signal (A+D) by third analog addition of the first light reception output signal (A) and the fourth light reception output signal (D) and the fourth addition output signal (B+C) by fourth analog addition of the second light reception output signal (B) and the third light reception output signal (C).

In the first operation mode, the first addition output signal (A+C) and the second addition output signal (B+D) generated from the arithmetic circuit (41) are supplied to analog input terminals of the two A/D converters (42a and 42b), and a first and digital addition output signal (A+C) and the second digital addition output signal (B+D) generated at digital output terminals of the two A/D converters (42a and 42b) are supplied to digital input terminals of the wobble signal generating circuit (33), the differential phase detection method signal generating circuit (34), and the amplitude correction detecting circuit (32, 4).

Figure 8:
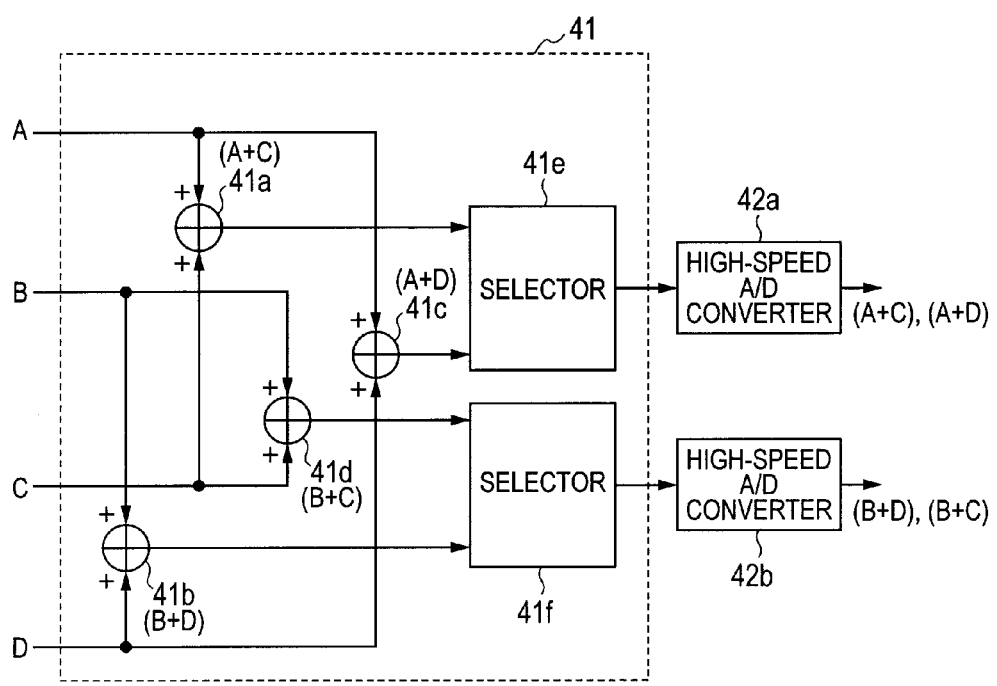
FIG. 8 is a diagram showing the configuration of an arithmetic circuit 41 included in a semiconductor integrated circuit LSI according to the first embodiment of the invention illustrated in FIG. 7.

In the second operation mode, the third addition output signal (A+D) and the fourth addition output signal (B+C) generated from the arithmetic circuit (41) are supplied to the analog input terminals of the two A/D converters (42a, 42b), the third digital addition output signal (A+D) and the fourth digital addition output signal (B+C) generated at the digital output terminals of the two A/D converters (42a, 42b) are supplied to the digital input terminals of the wobble signal generating circuit (33), the differential phase detection method signal generating circuit (34), and the amplitude correction detecting circuit (32, 4) (refer to FIGS. 7 and 8).

According to a concrete preferable embodiment, the arithmetic circuit (41) includes a first selector (41e) to which the first addition output signal (A+C) generated by the arithmetic circuit (41) which is set in the first operation mode and the third addition output signal (A+D) generated by the arithmetic circuit (41) which is set in the second operation mode can be supplied and a second selector (41f) to which the second addition output signal (B+D) generated by the arithmetic circuit (41) which is set in the first operation mode and the fourth addition output signal (B+C) generated by the arithmetic circuit (41) which is set in the second operation mode can be supplied.

Output terminals of the first selector (41e) and the second selector (41f) are coupled to the analog input terminals of the two A/D converters (42a, 42b) (refer to FIG. 8).

The semiconductor integrated circuit (LSI) according to a more preferable embodiment further includes a central processing unit (27) capable of discriminating the recordable disk and the unrecordable disk to be inserted in the optical disk device from each other.

In the case where the central processing unit (27) determines that a disk inserted in the optical disk device is the unrecordable disk, the central processing unit (27) sets the arithmetic circuit (41, 44) in the first operation mode, and the differential phase detection method signal generating circuit (34) generates the digital phase comparison signal ((A+C), (B+D)) by using the first addition output signal (A+C) and the second addition output signal (B+D) generated on the basis of the arithmetic operation of the arithmetic circuit (41, 44) which is set in the first operation mode.

In the case where the central processing unit (27) determines that a disk inserted in the optical disk device is the recordable disk, the central processing unit (27) sets the arithmetic circuit (41, 44) in the second operation mode, and the wobble signal generating circuit (33) generates the digital wobble signal by the execution of the digital subtraction operation (A+D)−(B+C) using the third addition output signal (A+D) and the fourth addition output signal (B+C) generated on the basis of the arithmetic operation of the arithmetic circuit (41, 44) which is set in the second operation mode.

According to a more preferable embodiment, when the first or second operation mode is set, the first light reception output signal (A) and the third light reception output signal (C) or the fourth light reception output signal (D) are alternately supplied to an input terminal of the A/D converter (42a) as one of the two A/D converters, when the first or second operation mode is set, the second light reception output signal (B) and the fourth light reception output signal (D) or the third light reception output signal (C) are alternately supplied to an input terminal of the A/D converter (42b) as the other one of the two A/D converters.

Figure 15:
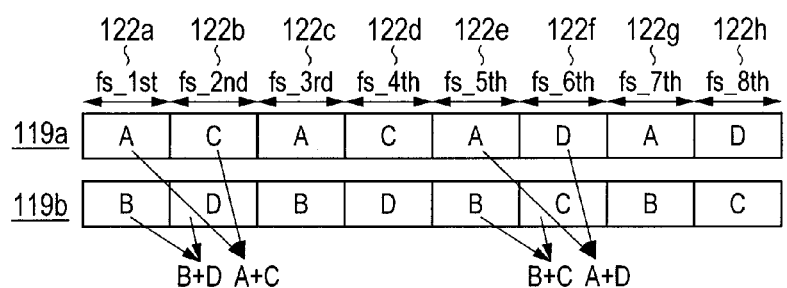
FIG. 15 is a diagram for explaining the operations of two selectors 119a and 119b, two high-speed A/D converters 42a and 42b, and an arithmetic circuit 44 in the preprocessing circuit 43 shown in FIG. 13.

The arithmetic circuit (44) adds a first light reception digital signal (A) and a third light reception digital signal (C) or a fourth light reception digital signal (D) generated alternately from an output terminal of the A/D converter (42a) as one of the A/D converters, outputs a first digital addition output signal (A+C) or a third digital addition output signal (A+D), adds a second light reception digital signal (B) and a fourth light reception digital signal (D) or a third light reception digital signal (C) generated alternately from an output terminal of the other A/D converter (42b), and outputs a second digital addition output signal (B+D) or a fourth digital addition output signal (B+C) (refer to FIG. 15).

The semiconductor integrated circuit (LSI) according to another concrete preferable embodiment further includes a preprocessing circuit (43) coupled to the input terminal of the A/D converter (42*a*) as one of the A/D converters and the input terminal of the other A/D converter (42*b*).

The preprocessing circuit (43) includes first, second, third, and fourth sample and hold circuits (118*a*, 118*b*, 118*c*, and 118*d*) and first and second selectors (119*a* and 119*b*).

An output terminal of the first sample and hold circuit (118*a*) and an output terminal of the third sample and hold circuit (118*c*) are coupled to two input terminals of the first selector (119*a*), an output terminal of the second sample and hold circuit (118*b*) and an output terminal of the fourth sample and hold circuit (118*d*) are coupled to two input terminals of the second selector (119*b*).

An output terminal of the first selector (119*a*) is coupled to the input terminal of the A/D converter (42*a*) as one of the A/D converters, and an output terminal of the second selector (119*b*) is coupled to the input terminal of the other A/D converter (42*b*).

In the first operation mode, the first, second, third, and fourth light reception output signals (A), (B), (C), and (D) are supplied to the input terminals of the first, second, third, and fourth sample and hold circuits (118*a*), (118*b*), (118*c*), and (118*d*), respectively.

In a sample period in the first operation mode, a first light reception sample signal (A) of the output terminal of the first sample and hold circuit (118*a*) and a second light reception sample signal (B) of the output terminal of the second sample and hold circuit (118*b*) are supplied to the input terminal of the A/D converter (42*a*) as one of the A/D converters and the input terminal of the other A/D converter (42*b*) via one of the input terminals and the output terminal of the first selector (119*a*) and one of the input terminals and the output terminal of the second selector (119*b*), respectively.

In a hold period in the first operation mode, a third light reception hold signal (C) of the output terminal of the third sample and hold circuit (118*c*) and a fourth light reception hold signal (D) of the output terminal of the fourth sample and hold circuit (118*d*) are supplied to the input terminal of the A/D converter (42*a*) as one of the A/D converters and the input terminal of the other A/D converter (42*b*) via the other input terminal and the output terminal of the first selector (119*a*) and the other input terminal and the output terminal of the second selector (119*b*), respectively.

In the second operation mode, the first, second, third, and fourth light reception output signals (A), (B), (C), and (D) are supplied to the input terminals of the first, second, fourth, and third sample and hold circuits (118*a*), (118*b*), (118*d*), and (118*c*), respectively.

In a sample period in the second operation mode, the first light reception sample signal (A) of the output terminal of the first sample and hold circuit (118*a*) and the second light reception sample signal (B) of the output terminal of the second sample and hold circuit (118*b*) are supplied to the input terminal of the A/D converter (42*a*) as one of the A/D converters and the input terminal of the other A/D converter (42*b*) via the one of the input terminals and the output terminal of the first selector (119*a*) and the one of the input terminals and the output terminal of the second selector (119*b*), respectively.

In a hold period in the second operation mode, the fourth light reception hold signal (D) of the output terminal of the fourth sample and hold circuit (118*d*) and the third light reception hold signal (C) of the output terminal of the third sample and hold circuit (118*c*) are supplied to the input terminal of the A/D converter (42*a*) as one of the A/D converters and the input terminal of the other A/D converter (42*b*) via the other input terminal and the output terminal of the first selector (119*a*) and the other input terminal and the output terminal of the second selector (119*b*), respectively.

A semiconductor integrated circuit according to another more concrete and preferable embodiment further includes a central processing unit (27) capable of discriminating the recordable disk and the unrecordable disk to be inserted in the optical disk device from each other.

In the case where the central processing unit (27) determines that a disk inserted in the optical disk device is the unrecordable disk, the central processing unit (27) sets the arithmetic circuit (41, 44) in the first operation mode, and the differential phase detection method signal generating circuit (34) generates the digital phase comparison signal ((A+C), (B+D)) by using the first addition output signal (A+C) and the second addition output signal (B+D) generated on the basis of the arithmetic operation of the arithmetic circuit (41, 44) which is set in the first operation mode.

In the case where the central processing unit (27) determines that a disk inserted in the optical disk device is the recordable disk, the central processing unit (27) sets the arithmetic circuit (41, 44) in the second operation mode, and the wobble signal generating circuit (33) generates the digital wobble signal by the execution of the digital subtraction operation (A+D)−(B+C) using the third addition output signal (A+D) and the fourth addition output signal (B+C) generated on the basis of the arithmetic operation of the arithmetic circuit (41, 44) which is set in the second operation mode.

According to another more preferable embodiment, when the first or second operation mode is set, the first light reception output signal (A) and the third light reception output signal (C) are alternately supplied to an input terminal of the A/D converter (42*a*) as one of the two A/D converters and, when the first or second operation mode is set, the second light reception output signal (B) and the fourth light reception output signal (D) are alternately supplied to an input terminal of the A/D converter (42*b*) as the other one of the two A/D converters.

Figure 18:
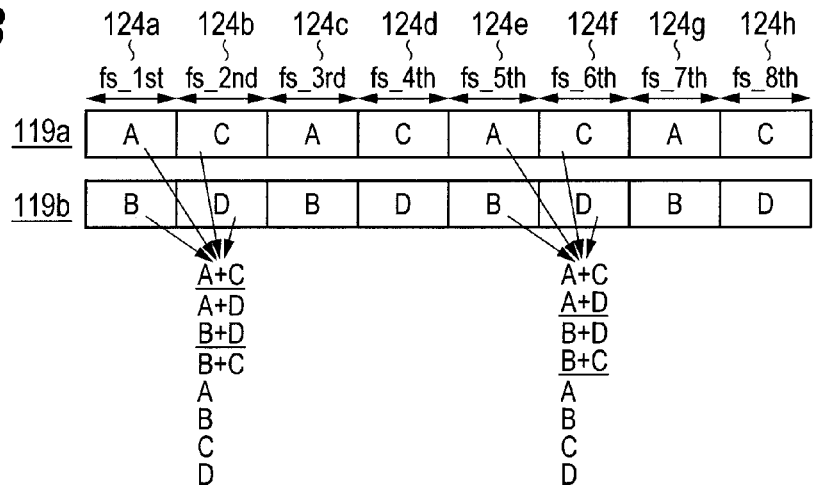
FIG. 18 is a diagram for explaining the operations of the two selectors 119a and 119b, two high-speed A/D converters 42a and 42b, and the arithmetic circuit 44 in the preprocessing circuit 43 shown in FIG. 16.

The arithmetic circuit (44) adds a first light reception digital signal (A) and a third light reception digital signal (C) generated from the output terminal of the A/D converter (42*a*) as one of the A/D converters or a fourth light reception digital signal (D) generated from the output terminal of the other A/D converter (42*b*), outputs a first digital addition output signal (A+C) or third digital addition output signal (A+D), or directly outputs a first light reception digital signal (A) and a third light reception digital signal (C) or a fourth light reception digital signal (D) without adding the first light reception signal (A) and the third light reception digital signal (C) or the fourth light reception digital signal (D), adds the second light reception digital signal (B) and the fourth light reception digital signal (D) generated from the output terminal of the other A/D converter (42*b*) or the third light reception digital signal (C) generated from an output terminal of the A/D converter (42*a*) as one of the A/D converters, and outputs a second digital addition output signal (B+D) or a fourth digital addition output signal (B+C), or without adding a second light reception digital signal (B) and a fourth light reception digital signal (D) or a third light reception digital signal (C), the second light reception digital signal (B) and the fourth light reception digital signal (D) or the third light reception digital signal (C) are directly output (refer to FIG. 18).

The semiconductor integrated circuit according to another concrete preferable embodiment further includes a preprocessing circuit (43) coupled to the input terminal of the A/D converter (42a) as one of the A/D converters and the input terminal of the other A/D converter (42b).

The preprocessing circuit (43) includes first, second, third, and fourth sample and hold circuits (118a), (118b), (118c), and (118d) and first and second selectors (119a) and (119b).

The output terminal of the first sample and hold circuit (118a) and the output terminal of the third sample and hold circuit (118c) are coupled to two input terminals of the first selector (119a), an output terminal of the second sample and hold circuit (118b) and an output terminal of the fourth sample and hold circuit (118d) are coupled to two input terminals of the second selector (119b).

The output terminal of the first selector (119a) is coupled to the input terminal of the A/D converter (42a) as one of the A/D converters, and the output terminal of the second selector (119b) is coupled to the input terminal of the other A/D converter (42b).

In the first operation mode, the first, second, third, and fourth light reception output signals (A), (B), (C), and (D) are supplied to the input terminals of the first, second, third, and fourth sample and hold circuits (118a), (118b), (118c), and (118d), respectively.

In a sample period in the first operation mode, a first light reception sample signal (A) of the output terminal of the first sample and hold circuit (118a) and a second light reception sample signal (B) of the output terminal of the second sample and hold circuit (118b) are supplied to the input terminal of the A/D converter (42a) as one of the A/D converters and the input terminal of the other A/D converter (42b) via one of the input terminals and the output terminal of the first selector (119a) and one of the input terminals and the output terminal of the second selector (119b), respectively.

In a hold period in the first operation mode, a third light reception hold signal (C) of the output terminal of the first sample and hold circuit (118c) and a fourth light reception hold signal (D) of the output terminal of the second sample and hold circuit (118d) are supplied to the input terminal of the A/D converter (42a) as one of the A/D converters and the input terminal of the other A/D converter (42b) via the other input terminal and the output terminal of the first selector (119a) and the other input terminal and the output terminal of the second selector (119b), respectively.

In the second operation mode, the first, second, third, and fourth light reception output signals (A), (B), (C), and (D) are supplied to the input terminals of the first, second, third, and fourth sample and hold circuits (118a), (118b), (118c), and (118d), respectively.

In a sample period in the second operation mode, the first light reception sample signal (A) of the output terminal of the first sample and hold circuit (118a) and the second light reception sample signal (B) of the output terminal of the second sample and hold circuit (118b) are supplied to the input terminal of the A/D converter (42a) as one of the A/D converters and the input terminal of the other A/D converter (42b) via the one of the input terminals and the output terminal of the first selector (119a) and the one of the input terminals and the output terminal of the second selector (119b), respectively.

In a hold period in the second operation mode, a third light reception hold signal (C) of the output terminal of the first sample and hold circuit (118c) and a fourth light reception hold signal (D) of the output terminal of the second sample and hold circuit (118d) are supplied to the input terminal of the A/D converter (42a) as one of the A/D converters and the input terminal of the other A/D converter (42b) via the other input terminal and the output terminal of the first selector (119a) and the other input terminal and the output terminal of the second selector (119b), respectively (refer to FIG. 18).

The semiconductor integrated circuit according to another more concrete and preferable embodiment further includes a central processing unit (27) capable of discriminating the recordable disk and the unrecordable disk to be inserted in the optical disk device from each other.

In the case where the central processing unit (27) determines that a disk inserted in the optical disk device is the unrecordable disk, the central processing unit (27) sets the arithmetic circuit (41, 44) in the first operation mode, and the differential phase detection method signal generating circuit (34) generates the digital phase comparison signal ((A+C), (B+D)) by using the first addition output signal (A+C) and the second addition output signal (B+D) generated on the basis of the arithmetic operation of the arithmetic circuit (41, 44) which is set in the first operation mode, or in the case where the central processing unit (27) determines that a disk inserted in the optical disk device is the unrecordable disk, outputs first, second, third, and fourth light reception hold signals (A), (B), (C), and (D) at the output terminals to the differential phase detection method signal generating circuit (34) on the basis of the arithmetic operation of the arithmetic circuit (41, 44) which is set in the first operation mode, and generates the digital phase comparison signal (A, B)+(C, D) by using the differential phase detection method signal generating circuit (34).

In the case where the central processing unit (27) determines that a disk inserted in the optical disk device is the recordable disk, the central processing unit (27) sets the arithmetic circuit (41, 44) in the second operation mode, and the wobble signal generating circuit (33) generates the digital wobble signal by the execution of the digital subtraction operation (A+D)−(B+C) using the third addition output signal (A+D) and the fourth addition output signal (B+C) generated on the basis of the arithmetic operation of the arithmetic circuit (41, 44) which is set in the second operation mode.

[2] A representative embodiment from another viewpoint of the present invention relates to an optical disk device having an optical pickup (PU) and a semiconductor integrated circuit (LSI).

The semiconductor integrated circuit (LSI) can receive a first light reception output signal (A), a second light reception output signal (B), a third light reception output signal (C), and a fourth light reception output signal (D) from four light receiving regions of a light receiving element of the optical pickup (PU).

The semiconductor integrated circuit (LSI) includes: a wobble signal generating circuit (33) capable of detecting a wobble in a recordable disk which is inserted in the optical disk device; and a differential phase detection method signal generating circuit (34) for tracking an unrecordable disk which is inserted in the optical disk device.

The semiconductor integrated circuit (LSI) further includes a cascade coupling of two A/D converters (42a, 42b) and arithmetic circuits (41, 44).

The first, second, third, and fourth light reception output signals (A), (B), (C), and (D) which are output from the light receiving element can be selectively supplied to the two A/D converters (42a, 42b).

When a first operation mode is set, the arithmetic circuit (41, 44) can generate a first addition output signal (A+C) of the first light reception output signal (A) and the third light reception output signal (C) and a second addition output signal (B+D) of the second light reception output signal (B) and the fourth light reception output signal (D).

When a second operation mode is set, the arithmetic circuit (41, 44) can generate a third addition output signal (A+D) of the first light reception output signal (A) and the fourth light reception output signal (D) and a fourth addition output signal (B+C) of the second light reception output signal (B) and the third light reception output signal (C).

The wobble signal generating circuit (33) generates a digital wobble signal by execution of digital subtraction operation (A+D)−(B+C) using the third addition output signal (A+D) and the fourth addition output signal (B+C) generated on the basis of arithmetic operation of the arithmetic circuit (41, 44) which is set in the second operation mode.

The differential phase detection method signal generating circuit (34) generates a digital phase comparison signal ((A+C), (B+D)) using the first addition output signal (A+C) and the second addition output signal (B+D) generated on the basis of arithmetic operation of the arithmetic circuit (41, 44) which is set in the first operation mode (refer to FIGS. 7 and 12).

According to the embodiment, the semiconductor chip occupation area is reduced, and higher precision and lower power consumption can be achieved.

2. Details of Embodiments

The embodiments will be described more specifically. In all of the drawings for explaining the best modes for carrying out the present invention, the same reference numerals are designated to parts having the same functions as those in the diagrams referred to and their description will not be repeated.

First Embodiment

Configuration of Semiconductor Integrated Circuit According to First Embodiment

FIG. 7 is a diagram showing the configuration of a semiconductor integrated circuit according to a first embodiment of the present invention which can be mounted on an optical disk device.

Figure 2:
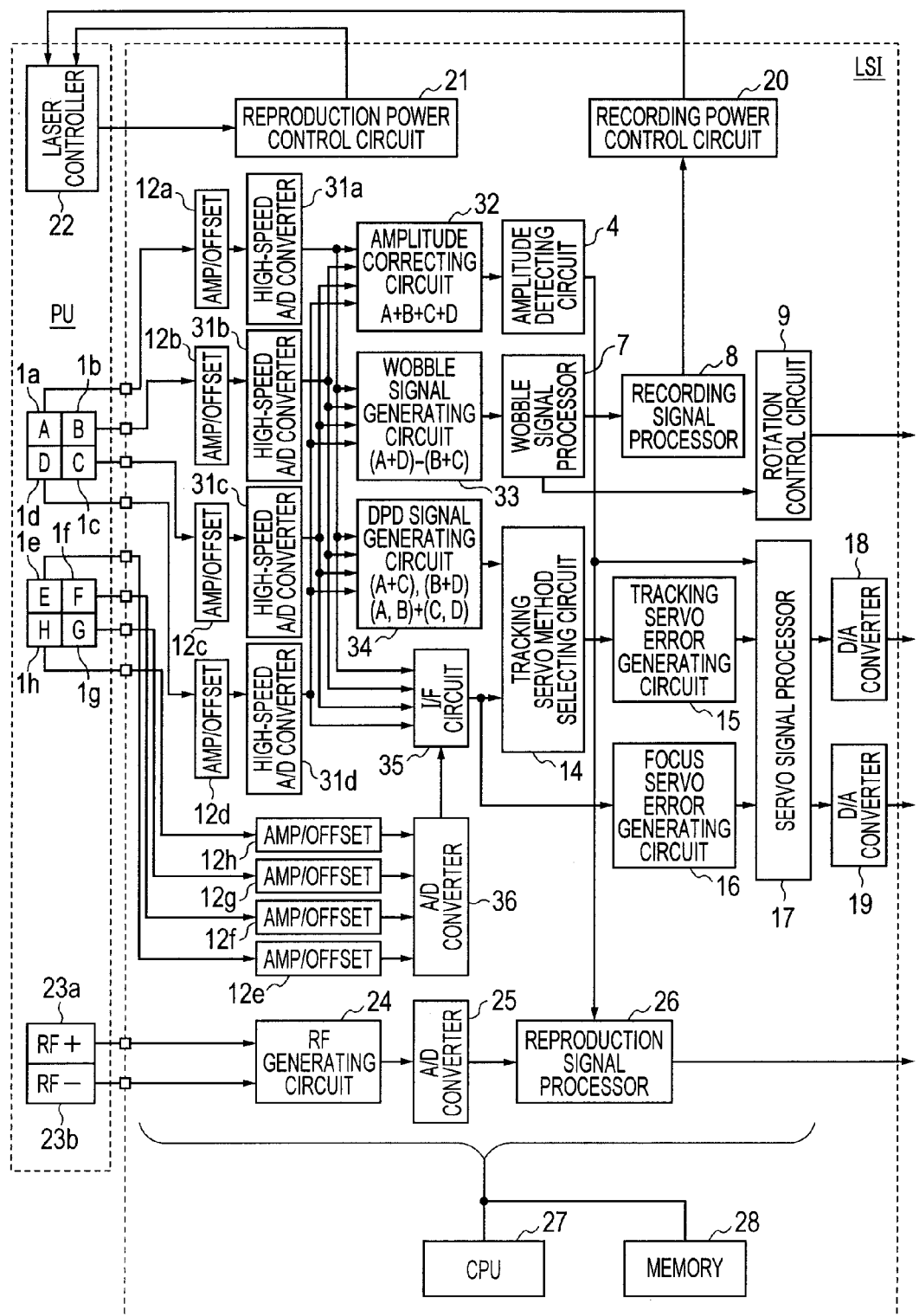
FIG. 2 is a diagram showing the configuration of a semiconductor integrated circuit which can be mounted on an optical disk device exampled by the inventors of the present invention prior to the present invention.
Figure 3:
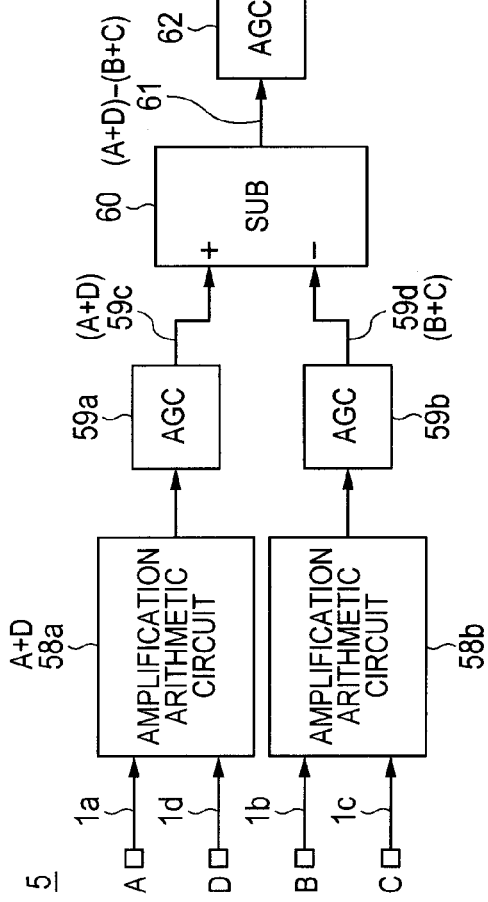
FIG. 3 is a diagram showing the configuration of a wobble signal generating circuit 5 included in a semiconductor integrated circuit LSI examined by the inventors of the present invention prior to the present invention illustrated in FIG.

A semiconductor integrated circuit LSI according to the first embodiment of the present invention shown in FIG. 7 is different from that shown in FIG. 2 with respect to the point that in place of the four high-speed A/D converters 31a to 31d shown in FIG. 2, an arithmetic circuit 41 and two high-speed A/D converters 42a and 42b coupled between the offset cancel amplifiers 12a to 12d, the amplitude correcting circuit 32, the wobble signal generating circuit 33, the DPD signal generating circuit 34, and the interface circuit 35 are included.

Specifically, in the semiconductor integrated circuit LSI shown in FIG. 7, four input terminals of the arithmetic circuit 41 are coupled to the output terminals of the offset cancel amplifiers 12a, 12b, 12c, and 12d, two output terminals of the arithmetic circuit 41 are coupled to the input terminals of the two high-speed A/D converters 42a and 42b, and the output terminals of the two high-speed A/D converters 42a and 42b are coupled to the input terminals of the amplitude correcting circuit 32, the wobble signal generating circuit 33, the DPD signal generating circuit 34, and the interface circuit 35. Since the other configuration of the semiconductor integrated circuit LSI shown in FIG. 7 is the same as that of the semiconductor integrated circuit LSI shown in FIG. 2, the description will not be repeated.

Configuration and Operation of Arithmetic Circuit

FIG. 8 is a diagram showing the configuration of the arithmetic circuit 41 included in the semiconductor integrated circuit LSI according to the first embodiment of the invention illustrated in FIG. 7.

The arithmetic circuit 41 shown in FIG. 8 includes four analog adders 41a, 41b, 41c, and 41d, and two selectors 41e and 41f. The first analog adder 41a generates a first analog addition output signal (A+C) by execution of addition operation of output signals A and C of the offset cancel amplifiers 12a and 12c. The second analog adder 41b generates a second analog addition output signal (B+D) by execution of addition operation of outputs B and D of the offset cancel amplifiers 12b and 12d. The third analog adder 41c generates a third analog addition output signal (A+D) by execution of addition operation of output signals A and D of the offset cancel amplifiers 12a and 12d. The fourth analog adder 41d generates a fourth analog addition output signal (B+C) by execution of addition operation of outputs B and C of the offset cancel amplifiers 12b and 12c.

The first analog addition output signal (A+C) of the first analog adder 41a and the third analog addition output signal (A+D) of the third analog adder 41c are supplied to different input terminals of the first selector 41e. The second analog addition output signal (B+D) of the second analog adder 41b and the fourth analog addition output signal (B+C) of the fourth analog adder 41d are supplied to different input terminals of the second selector 41f.

A first selection output signal of the first selector 41e and a second selection output signal of the second selector 41f are supplied to the input terminal of the first high-speed A/D converter 42a and the input terminal of the second high-speed A/D converter 42b, respectively.

The first and second selectors 41e and 41f of the arithmetic operation 41 shown in FIG. 8 can be set in any of the first and second operation modes by mode control of the central processing unit (CPU) 27 in the semiconductor integrated circuit LSI shown in FIG. 7. In the first operation mode, the first analog addition output signal (A+C) of the first analog adder 41a supplied to one of the input terminals of the first selector 41e and the second analog addition output signal (B+D) of the second analog adder 41b supplied to one of the input terminals of the second selector 41f are selected by the first selector 41e and the second selector 41f, respectively, and are supplied to the input terminal of the first high-speed A/D converter 42a and the input terminal of the second high-speed A/D converter 42b. In the second operation mode, the third analog addition output signal (A+D) of the third analog adder 41c supplied to the other input terminal of the first selector 41e and the fourth analog addition output signal (B+C) of the fourth analog adder 41d supplied to the other input terminal of the second selector 41f are selected by the first selector 41e and the second selector 41f, respectively, and are supplied to the input terminal of the first high-speed A/D converter 42a and the input terminal of the second high-speed A/D converter 42b.

Amplitude Correcting Operation

When the amplitude correcting operation by the amplitude correcting circuit 32 included in the semiconductor integrated circuit LSI according to the first embodiment of the invention shown in FIG. 7 is executed, the first and second selectors 41e and 41f of the arithmetic circuit 41 shown in FIG. 8 are set in the first operation mode by mode control of the central processing unit (CPU) 27 in the semiconductor integrated circuit LSI shown in FIG. 7.

Therefore, the first analog addition output signal (A+C) of the first analog adder 41a supplied to one of the input terminals of the first selector 41e and the second analog addition output signal (B+D) of the second analog adder 41b supplied to one of the input terminals of the second selector 41f are selected by the first selector 41e and the second selector 41f, respectively, and are supplied to the input terminal of the first high-speed A/D converter 42a and the input terminal of the second high-speed A/D converter 42b. As a result, the first digital addition output signal (A+C) at the output terminal of the first high-speed A/D converter 42a and the second digital addition output signal (B+D) at the output terminal of the second high-speed A/D converter 42b are supplied to two input terminals of the amplitude correcting circuit 32, so that the amplitude correcting circuit 32 executes addition operation of (A+C)+(B+D).

In another embodiment, the first and second selectors 41e and 41f of the arithmetic circuit 41 shown in FIG. 8 are set in the second operation mode by the mode control of the central processing unit (CPU) 27 in the semiconductor integrated circuit LSI shown in FIG. 7. Therefore, the third analog addition output signal (A+D) of the third analog adder 41c supplied to the other input terminal of the first selector 41e and the fourth analog addition output signal (B+C) of the fourth analog adder 41d supplied to the other input terminal of the second selector 41f are selected by the first selector 41e and the second selector 41f, respectively, and are supplied to the input terminal of the first high-speed A/D converter 42a and the input terminal of the second high-speed A/D converter 42b. As a result, the third digital addition output signal (A+D) at the output terminal of the first high-speed A/D converter 42a and the fourth digital addition output signal (B+C) at the output terminal of the second high-speed A/D converter 42b are supplied to two input terminals of the amplitude correcting circuit 32, so that the amplitude correcting circuit 32 executes addition operation of (A+D)+(B+C).

Wobble Signal Generating Operation

In the case where an optical disk of any of types such as CD-R, CD-RW, DVD-R, DVD-RW, DVD-RAM, BD-R1, and BD-RE as recordable optical disks is loaded to an optical disk device having the semiconductor integrated circuit according to the first embodiment of the invention shown in FIG. 7, a wobble signal has to be generated to accurately detect linear velocity in each of radius positions of the optical disk.

In the case where the wobble signal generating operation is executed by the wobble signal generating circuit 33 included in the semiconductor integrated circuit LSI according to the first embodiment of the invention shown in FIG. 7, the first and second selectors 41e and 41f of the arithmetic circuit 41 shown in FIG. 8 are set to the second operation mode by the mode control of the central processing unit (CPU) 27 in the semiconductor integrated circuit LSI illustrated in FIG. 7. This can be performed by discriminating the type of a recordable optical disk by the central processing unit (CPU) 27.

Therefore, the third analog addition output signal (A+D) of the third analog adder 41c supplied to the other input terminal of the first selector 41e and the fourth analog addition output signal (B+C) of the fourth analog adder 41d supplied to the other input terminal of the second selector 41f are selected by the first selector 41e and the second selector 41f, respectively, and are supplied to the input terminal of the first high-speed A/D converter 42a and the input terminal of the second high-speed A/D converter 42b. As a result, the third digital addition output signal (A+D) at the output terminal of the first high-speed A/D converter 42a and the fourth digital addition output signal (B+C) at the output terminal of the second high-speed A/D converter 42b are supplied to two input terminals of the wobble signal generating circuit 33, so that the wobble signal generating circuit 33 executes digital arithmetic operation of (A+D)−(B+C).

Figure 9:
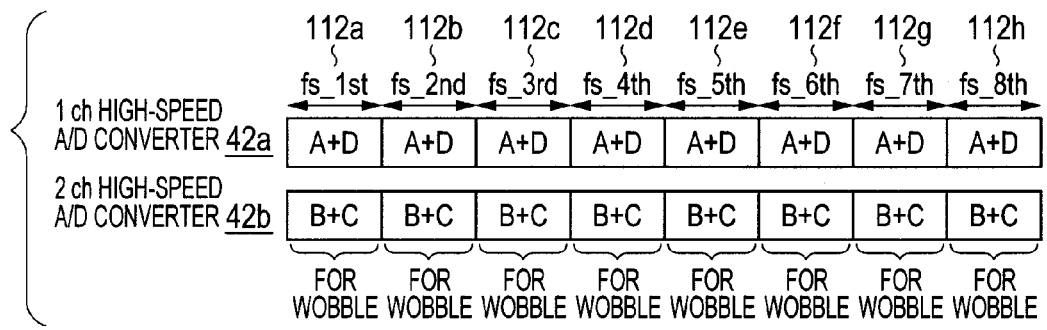
FIG. 9 is a diagram for explaining the operation of first and second high-speed A/D converters 42a and 42b when wobble signal generating operation by a wobble signal generating circuit 33 included in the semiconductor integrated circuit LSI according to the first embodiment of the invention shown in FIG. 7 is executed.

FIG. 9 is a diagram for explaining the operation of first and second high-speed A/D converters 42a and 42b when wobble signal generating operation by the wobble signal generating circuit 33 included in the semiconductor integrated circuit LSI according to the first embodiment of the invention shown in FIG. 7 is executed.

As shown in FIG. 9, at operation timings 112a to 112h in the time series, the first high-speed A/D converter 42a outputs the third digital addition output signal (A+D) and, simultaneously, the second high-speed A/D converter 42b outputs the fourth digital addition output signal (B+C).

DPD Generating Operation

In the case where an optical disk of an unrecordable type on which reproduction data is already written such as a BD-ROM or DVD-ROM is loaded in an optical disk device having the semiconductor integrated circuit according to the first embodiment of the invention shown in FIG. 7, DPD has to be generated.

In the case where the DPD generating operation by the DPD signal generating circuit 34 included in the semiconductor integrated circuit LSI according to the first embodiment of the invention shown in FIG. 7 is executed, the first and second selectors 41e and 41f of the arithmetic circuit 41 shown in FIG. 8 are set in the first operation mode by mode control of the central processing unit (CPU) 27 of the semiconductor integrated circuit LSI shown in FIG. 7. This can be performed by discriminating the type of a recordable optical disk by the central processing unit (CPU) 27.

Therefore, the first analog addition output signal (A+C) of the first analog adder 41a supplied to one of the input terminals of the first selector 41e and the second analog addition output signal (B+D) of the second analog adder 41b supplied to one of the input terminals of the second selector 41f are selected by the first selector 41e and the second selector 41f, respectively, and are supplied to the input terminal of the first high-speed A/D converter 42a and the input terminal of the second high-speed A/D converter 42b. As a result, the first digital addition output signal (A+C) at the output terminal of the first high-speed A/D converter 42a and the second digital addition output signal (B+D) at the output terminal of the second high-speed A/D converter 42b are supplied to two input terminals of the digital phase comparing circuit of the DPD signal generating circuit 34, so that the digital phase comparing circuit of the DPD signal generating circuit 34 executes digital phase comparison. Therefore, the digital phase comparison signals (A+C), (B+D) are generated from the output terminal of the DPD signal generating circuit 34.

Figure 10:
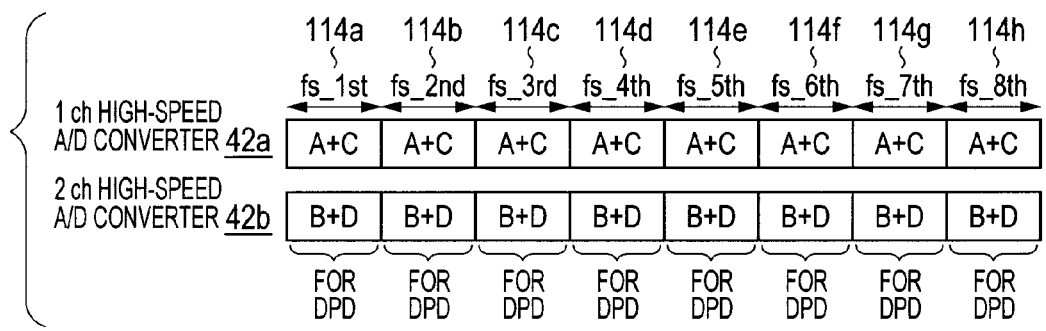
FIG. 10 is a diagram for explaining the operation of the first and second high-speed A/D converters 42a and 42b when DPD generating operation by a DPD signal generating circuit 34 included in the semiconductor integrated circuit LSI according to the first embodiment of the present invention shown in FIG. 7 is executed.

FIG. 10 is a diagram for explaining the operation of the first and second high-speed A/D converters 42a and 42b when DPD generating operation by the DPD signal generating circuit 34 included in the semiconductor integrated circuit LSI according to the first embodiment of the present invention shown in FIG. 7 is executed.

As shown in FIG. 10, at operation timings 114a to 114h in the time series, the first high-speed A/D converter 42a outputs the first digital addition output signal (A+C) and, simultaneously, the second high-speed A/D converter 42b outputs the second digital addition output signal (B+D).

Detection of ROM Mark

As described above, a wobble is employed by a data recordable optical disk. A wobble is exceptionally employed also in a read-only BD-ROM. Further, as a technique unit to BD (Blue-Ray Disk), to prevent illegal mass-copying, a format called ROM mark is recorded on a BD-ROM at the time of manufacturing disks.

When a ROM mark recorded on a BD-ROM is correctly detected by an optical disk device having the semiconductor integrated circuit according to the first embodiment of the invention shown in FIG. 7, the BD-ROM can be reproduced. However, even when the ROM mark is correctly detected by the optical disk device, illegal copying cannot be performed. On the other hand, in the case where the ROM mark cannot be detected, illegal copying cannot be also performed.

On the other hand, when the optical disk device detects a ROM mark recorded on a BD-ROM, using the fact that reproduction speed (optical disk rotation speed) is slow, acquisition of a differential phase detection (DPD) signal for detecting a tracking error signal of the BD-ROM and acquisition of a wobble signal for detecting the BD-ROM can be executed while being serially switched.

FIG. 11 is a diagram for explaining the operation of first and second high-speed A/D converters 42a and 42b when the DPD generating operation by the DPD signal generating circuit 34 and the ROM mark detecting operation by the wobble signal generating circuit 33 are executed while being alternately serially switched in the semiconductor integrated circuit LSI according to the first embodiment of the invention shown in FIG. 7.

As shown in FIG. 11, at odd-numbered operation timings 116a, 116c, 116e, and 116g in the time series, the first and second selectors 41e and 41f in the arithmetic operation 41 of FIG. 8 are set in the first operation mode by mode control of the central processing unit (CPU) 27 in FIG. 7, so that the first high-speed A/D converter 42a outputs the first digital addition output signal (A+C), and the second high-speed A/D converter 42b outputs the second digital addition output signal (B+D). The first digital addition output signal (A+C) from the first high-speed A/D converter 42a and the second digital addition output signal (B+D) from the second high-speed A/D converter 42b are supplied to two input terminals of the DPD signal generating circuit 34. The DPD signal generating circuit 34 executes the DPD generating operation by execution of the digital phase comparison. Data supplied to the two input terminals of the DPD signal generating circuit 34 by DPD generating operation at low-speed reproduction speed is reduced, so that an intermediate or low data rate can be set.

Further, as shown in FIG. 11, at even-numbered operation timings 116b, 116d, 116f, and 116h in the time series, the first and second selectors 41e and 41f in the arithmetic operation 41 of FIG. 8 are set in the second operation mode by mode control of the central processing unit (CPU) 27 in FIG. 7, so that the first high-speed A/D converter 42a outputs the third digital addition output signal (A+D), and the second high-speed A/D converter 42b outputs the fourth digital addition output signal (B+C). The third digital addition output signal (A+D) from the first high-speed A/D converter 42a and the fourth digital addition output signal (B+C) from the second high-speed A/D converter 42b are supplied to two input terminals of the wobble signal generating circuit 33. The wobble signal generating circuit 33 executes the ROM mark detecting operation by execution of the digital computation (A+D)−(B+C). In the ROM mark detecting operation of low-reproduction speed, data supplied to the two input terminals of the wobble signal generating circuit 33 is reduced, and an intermediate or low data rate can be achieved.

Therefore, when the ROM mark is correctly detected by the ROM mark detecting operation of the wobble signal generating circuit 33 at the even-numbered operation timings 116b, 116d, 116f, and 116h in the time series of FIG. 11, the optical disk device having the semiconductor integrated circuit LSI according to the first embodiment of the invention shown in FIG. 7 is set to normal reproduction speed (normal operation disk rotation speed). Consequently, at the odd-numbered operation timings 116a, 116c, 116e, and 116g and the even-numbered operation timings 116b, 116d, 116f, and 116h in the time series in FIG. 11, the first and second selectors 41e and 41f in the arithmetic circuit 41 of FIG. 8 are always set to the first operation mode by the mode control of the central processing unit (CPU) 27 in FIG. 7. The first high-speed A/D converter 42a outputs the first digital addition output signal (A+C), and the second high-speed A/D converter 42b outputs the second digital addition output signal (B+D). Therefore, the first digital addition output signal (A+C) from the first high-speed A/D converter 42a and the second digital addition output signal (B+D) from the second high-speed A/D converter 42b are always supplied to the two input terminals of the DPD signal generating circuit 34. The DPD signal generating circuit 34 always executes the DPD generating operation for detecting a tracking error signal of the BD-ROM by execution of the digital phase comparison. In the DPD generating operation at the normal reproduction speed, data supplied to the two input terminals of the DPD signal generating circuit 34 is not reduced, and a high data rate is set.

Operation in DPP Method

As described above, the differential push pull (DPP) method used for recording of an optical disk device and reproduction of a disk such as CD-ROM requires the above-described wobble signal generating operation, supply of the output signals 1e, 1f, 1g, and 1h by the A/D converter 36 coupled to the offset cancel amplifiers 12e to 12h as digital signals from the four regions E, F, G, and H of the sub light receiving element to the tracking servo error generating circuit 15 via the interface circuit 35, and execution of arithmetic operation of $(A+D)-(B+C)-\alpha\{(E+H)-(F+G)\}$.

Therefore, at the time of the DPP method operation, the first and second selectors 41e and 41f of the arithmetic circuit 41 shown in FIG. 8 are set in the second operation mode by the mode control of the central processing unit (CPU) 27 in the semiconductor integrated circuit LSI shown in FIG. 7. This can be performed by discrimination of recording of an optical disk device or reproduction of a CD-ROM by the central processing unit (CPU) 27.

Therefore, the third analog addition output signal (A+D) of the third analog adder 41c supplied to the other input terminal of the first selector 41e and the fourth analog addition output signal (B+C) of the fourth analog adder 41d supplied to the other input terminal of the second selector 41f are selected by the first selector 41e and the second selector 41f, respectively, and are supplied to the input terminal of the first high-speed A/D converter 42a and the input terminal of the second high-speed A/D converter 42b. As a result, the third digital addition output signal (A+D) at the output terminal of the first high-speed A/D converter 42a and the fourth digital addition output signal (B+C) at the output terminal of the second high-speed A/D converter 42b are sequentially supplied to the other input terminal of the tracking servo method selecting circuit 14 via the interface circuit 35. The tracking servo method selecting circuit 14 outputs the third digital addition output signal (A+D) and the fourth digital addition output signal (B+C) to the input terminal of the tracking servo error generating circuit 15. On the other hand, the output signals 1e, 1f, 1g, and 1h as digital signals of the four regions E, F, G, and H of the sub light receiving element are supplied to the tracking servo error generating circuit 15 via the interface circuit 35. Thus, the tracking servo error generating circuit 15 can generate a tracking error signal for the tracking operation in the DPP method by execution of the digital arithmetic operation $(A+D)-(B+C)-\alpha\{(E+H)-(F+G)\}$.

Since the third digital addition output signal (A+D) of the first high-speed A/D converter 42a and the fourth digital addition output signal (B+C) of the second high-speed A/D converter 42b are supplied to the two input terminals of the amplitude correcting circuit 32, the amplitude correcting circuit 32 executes addition of (A+D)+(B+C). As a result, in reproduction of a disk such as a CD-ROM, when a scratch exists in a CD-ROM, a scratch detection signal can be supplied from the amplitude detecting circuit 4 to the reproduction signal processor 26.

Second Embodiment

Configuration of Semiconductor Integrated Circuit According to Second Embodiment FIG. 12 is a diagram showing the configuration of a semiconductor integrated circuit according to a second embodiment of the present invention, which can be mounted on an optical disk device.

A semiconductor integrated circuit LSI according to the second embodiment of the present invention shown in FIG. 12 is different from the semiconductor integrated circuit LSI according to the first embodiment of the invention shown in FIG. 7 with respect to the point that in place of the arithmetic circuit 41 and the two high-speed A/D converters 42a and 42b shown in FIG. 7, a preprocessing circuit 43, two high-speed A/D converters 42a and 42b, and an arithmetic circuit 44 coupled between the offset cancel amplifiers 12a to 12d, the amplitude correcting circuit 32, the wobble signal generating circuit 33, the DPD signal generating circuit 34, and the interface circuit 35 are included.

Specifically, in the semiconductor integrated circuit LSI according to the second embodiment of the invention shown in FIG. 12, four input terminals of the preprocessing circuit 43 are coupled to the output terminals of the four offset cancel amplifiers 12a, 12b, 12c, and 12d, two output terminals of the preprocessing circuit 43 are coupled to the input terminals of the two high-speed A/D converters 42a and 42b, and the output terminals of the two high-speed A/D converters 42a and 42b are coupled to the two input terminals of the arithmetic circuit 44, and the two output terminals of the arithmetic circuit 44 are coupled to the input terminals of the amplitude correcting circuit 32, the wobble signal generating circuit 33, the DPD signal generating circuit 34, and the interface circuit 35.

Particularly, the preprocessing circuit 43 has an input selecting function of the four input terminals A, B, C, and D, a sample-and-hold function on four selection input signals, and an output selecting function on a sample-and-hold output signal. Further, the two high-speed A/D converters 42a and 42b convert two analog signals which are output in the sample period of the preprocessing circuit 43 to two digital signals, supply the two digital signals to the two input terminals of the arithmetic circuit 44, further, converts other two analog signals which are output in the hold period of the preprocessing circuit 43 to other two digital signals, and supply the digital signals to the two input terminals of the arithmetic circuit 44. Further, the arithmetic circuit 44 adds two digital signals which are output in the sample period from the two high-speed A/D converters 42a and 42b and other two digital signals which are output in the hold period from the two high-speed A/D converters 42a and 42b, thereby generating two digital arithmetic output signals, and supplies the signals to the input terminals of the amplitude correcting circuit 32, the wobble signal generating circuit 33, the DPD signal generating circuit 34, and the interface circuit 35. Since the other configuration of the semiconductor integrated circuit LSI shown in FIG. 12 is the same as that shown in FIG. 7, the description will not be repeated.

Configuration and Operation of Preprocessing Circuit

Figure 13:
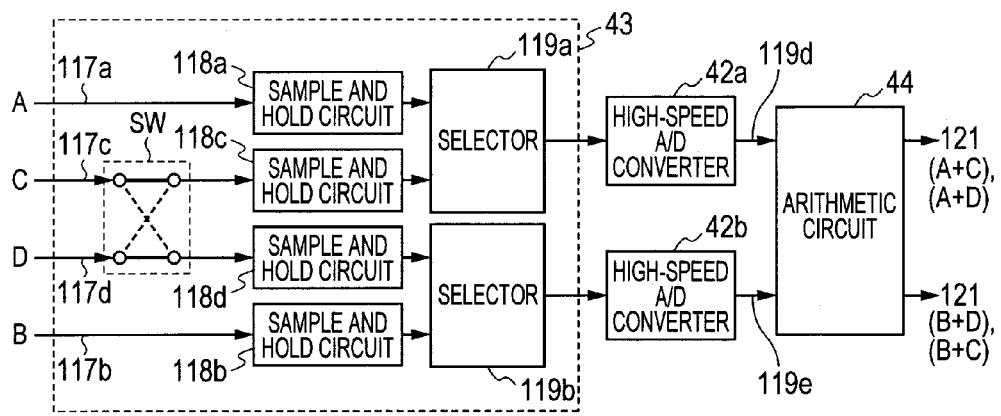
FIG. 13 is a diagram showing the configuration of preprocessing circuit 43 included in the semiconductor integrated circuit LSI according to the second embodiment of the invention illustrated in FIG. 12.

FIG. 13 is a diagram showing the configuration of the preprocessing circuit 43 included in the semiconductor integrated circuit LSI according to the second embodiment of the invention illustrated in FIG. 12.

As shown in FIG. 13, the preprocessing circuit 43 includes a change-over switch SW, four sample and hold circuits 118a, 118b, 118c, and 118d, and two selectors 119a and 119b. An output signal A of the offset cancel amplifier 12a is supplied to an input terminal 117a of the sample and hold circuit 118a, an output signal B of the offset cancel amplifier 12b is supplied to an input terminal 117b of the sample and hold circuit 118b, an output signal C of the offset cancel amplifier 12c is supplied to an input terminal 117c as one of input terminals of the change-over switch SW, and an output signal D of the offset cancel amplifier 12d is supplied to the other input terminal 117d of the change-over switch SW.

In the first operation mode by the mode control of the central processing unit (CPU) 27 included in the semiconductor integrated circuit LSI according to the second embodiment of the invention shown in FIG. 12, as shown by thick solid lines in FIG. 13, the change-over switch SW couples the input terminal 117c and the other input terminal 117d to the input terminal of the sample and hold circuit 118c and the input terminal of the sample and hold circuit 118d, respectively. In the second operation mode by the mode control, as shown by broken lines in FIG. 13, the change-over switch SW couples the input terminal 117c and the other input terminal 117d to the input terminal of the sample and hold circuit 118d and the input terminal of the sample and hold circuit 118c, respectively.

Figure 14:
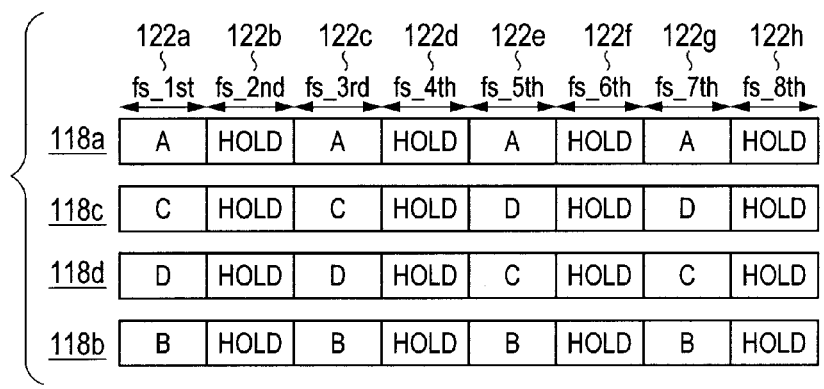
FIG. 14 is a diagram for explaining the operations of a change-over switch SW and four sample and hold circuits 118a, 118b, 118c, and 118d in the preprocessing circuit 43 shown in FIG. 13.

FIG. 14 is a diagram for explaining the operations of the four sample and hold circuits 118a, 118b, 118c, and 118d in the preprocessing circuit 43 shown in FIG. 13.

As shown in FIG. 14, at odd-numbered operation timings 122a, 122c, 122e, and 122g in the time series, the four sample and hold circuits 118a, 118c, 118d, and 118b execute the sampling operation. At even-numbered operation timings 122b, 122d, 122f, and 122h in the time series, the four sample and hold circuits 118a, 118c, 118d, and 118b execute the holding operation. Further, as shown in FIG. 14, from the first operation timing 112a to the fourth operation timing 112d, the change-over switch SW is set in the first operation mode, and the input terminals 117c and 117d of the change-over switch SW are coupled to the input terminal of the sample and hold circuit 118c and the input terminal of the sample and hold circuit 118d, respectively. From the fifth operation timing 112e to the eighth operation timing 112h, the change-over switch SW is set in the second operation mode, and the input terminals 117c and 117d of the change-over switch SW are coupled to the input terminal of the sample and hold circuit 118d and the input terminal of the sample and hold circuit 118c, respectively.

As a result, as shown in FIG. 14, at the former two sampling operation timings 112a and 112c, the four sample and hold circuits 118a, 118c, 118d, and 118b output the input signals A, C, D, and B in the sample period. At the latter two sampling operation timings 112e and 112g, the four sample and hold circuits 118a, 118c, 118d, and 118b output the input signals A, D, C, and B in the sample period. Further, at the former two holding operation timings 112b and 112d, the four sample and hold circuits 118a, 118c, 118d, and 118b output the hold signals A, C, D, and B in the hold period. At the latter two holding operation timings 112*f* and 112*h*, the four sample and hold circuits 118*a*, 118*c*, 118*d*, and 118*b* output the hold signals A, D, C, and B in the hold period.

FIG. 15 is a diagram for explaining the operations of the two selectors 119*a* and 119*b*, the two high-speed A/D converters 42*a* and 42*b*, and the arithmetic circuit 44 in the preprocessing circuit 43 shown in FIG. 13.

As shown in FIG. 15, at odd-numbered operation timings 122*a*, 122*c*, 122*e*, and 122*g* in the time series, the two selectors 119*a* and 119*b* select the input signals A and B in the sample period, which are output from the upper and lower two sample and hold circuits 118*a* and 118*b*, and the input signals A and B are converted to sample digital signals by the two high-speed A/D converters 42*a* and 42*b*, and the two sample digital signals are supplied to the two input terminals of the arithmetic circuit 44.

As shown in FIG. 15, at the even-numbered operation timings 122*b*, 122*d*, 122*f*, and 122*h* in the time series, the two selectors 119*a* and 119*b* select hold signals C and D or hold signals D and C in the hold period, which are output from the two sample and hold circuits 118*c* and 118*d* in the center, and the hold signals C and D or D and C are converted to hold digital signals by the two high-speed A/D converters 42*a* and 42*b*, and the two hold digital signals are supplied to the two input terminals of the arithmetic circuit 44.

As a result, as shown in FIG. 15, the two sample digital signals A and B supplied in the sample period at the odd-numbered operation timings 122*a*, 122*c*, 122*e*, and 122*g* in the time series and the hold signals C and D or the hold signals D and C supplied in the hold period at the even-numbered operation timings 122*b*, 122*d*, 122*f*, and 122*h* in the time series are added by the arithmetic circuit 44.

As a result, as shown in FIG. 15, at the former four operation timings 122*a* to 122*d*, the first digital addition output signal (A+C) and the second digital addition output signal (B+D) are output from the two output terminals of the arithmetic circuit 44. At the latter four operation timings 122*e* to 122*h*, the third digital addition output signal (A+D) and the fourth digital addition output signal (B+C) are output from the two output terminals of the arithmetic circuit 44.

Therefore, in a manner similar to the semiconductor integrated circuit LSI according to the first embodiment of the invention of FIG. 7, the first digital addition output signal (A+C), the second digital addition output signal (B+D), the third digital addition output signal (A+D), and the fourth digital addition output signal (B+C) which are output by the preprocessing circuit 43, the two high-speed A/D converters 42*a* and 42*b*, and the arithmetic circuit 44 included in the semiconductor integrated circuit LSI according to the second embodiment of the invention of FIG. 12 are used for digital addition operation of (A+C)+(B+D) or (A+D)+(B+C) in the amplitude correcting circuit 32, used for digital operation (A+D)−(B+C) in the wobble signal generating circuit 33, used for generation of the digital phase comparison signals (A+C), (B+D) in the DPD signal generating circuit 34, and used for detection of a ROM mark by execution of the digital operation (A+D)−(B+C) in the wobble signal generating circuit 33.

Third Embodiment

Configuration of Semiconductor Integrated Circuit According to Third Embodiment

FIG. 12 is a diagram showing the configuration of a semiconductor integrated circuit according to a third embodiment of the present invention, which can be mounted on an optical disk device.

A semiconductor integrated circuit LSI according to the third embodiment of the present invention shown in FIG. 12 is different from the semiconductor integrated circuit LSI according to the first embodiment of the invention shown in FIG. 7 with respect to the point that in place of the arithmetic circuit 41 and the two high-speed A/D converters 42*a* and 42*b* shown in FIG. 7, the preprocessing circuit 43, the two high-speed A/D converters 42*a* and 42*b*, and the arithmetic circuit 44 coupled between the offset cancel amplifiers 12*a* to 12*d*, the amplitude correcting circuit 32, the wobble signal generating circuit 33, the DPD signal generating circuit 34, and the interface circuit 35 are included.

Specifically, in the semiconductor integrated circuit LSI according to the third embodiment of the invention shown in FIG. 12, four input terminals of the preprocessing circuit 43 are coupled to the output terminals of the four offset cancel amplifiers 12*a*, 12*b*, 12*c*, and 12*d*, two output terminals of the preprocessing circuit 43 are coupled to the input terminals of the two high-speed A/D converters 42*a* and 42*b*, and the output terminals of the two high-speed A/D converters 42*a* and 42*b* are coupled to the two input terminals of the arithmetic circuit 44, and the two output terminals of the arithmetic circuit 44 are coupled to the input terminals of the amplitude correcting circuit 32, the wobble signal generating circuit 33, the DPD signal generating circuit 34, and the interface circuit 35.

Particularly, the preprocessing circuit 43 has an input selecting function of the four input terminals A, B, C, and D, a sample-and-hold function on four selection input signals, and an output selecting function on a sample-and-hold output signal. Further, the two high-speed A/D converters 42*a* and 42*b* convert two analog signals which are output in the sample period of the preprocessing circuit 43 to two digital signals, supply the two digital signals to the two input terminals of the arithmetic circuit 44, further, convert other two analog signals which are output in the hold period of the preprocessing circuit 43 to other two digital signals, and supply the digital signals to the two input terminals of the arithmetic circuit 44. Further, the arithmetic circuit 44 adds two digital signals which are output in the sample period from the two high-speed A/D converters 42*a* and 42*b* and other two digital signals which are output in the hold period from the two high-speed A/D converters 42*a* and 42*b*, thereby generating two digital arithmetic output signals, and supplies the signals to the input terminals of the amplitude correcting circuit 32, the wobble signal generating circuit 33, the DPD signal generating circuit 34, and the interface circuit 35. Further, the arithmetic circuit 44 supplies two digital signals which are output in the sample period from the two high-speed A/D converters 42*a* and 42*b* and other two digital signals which are output in the hold period from the two high-speed A/D converters 42*a* and 42*b* to the input of the DPD signal generating circuit 34 without adding the digital signals. Since the other configuration of the semiconductor integrated circuit LSI shown in FIG. 12 is the same as that shown in FIG. 7, the description will not be repeated.

Configuration and Operation of Preprocessing Circuit

Figure 16:
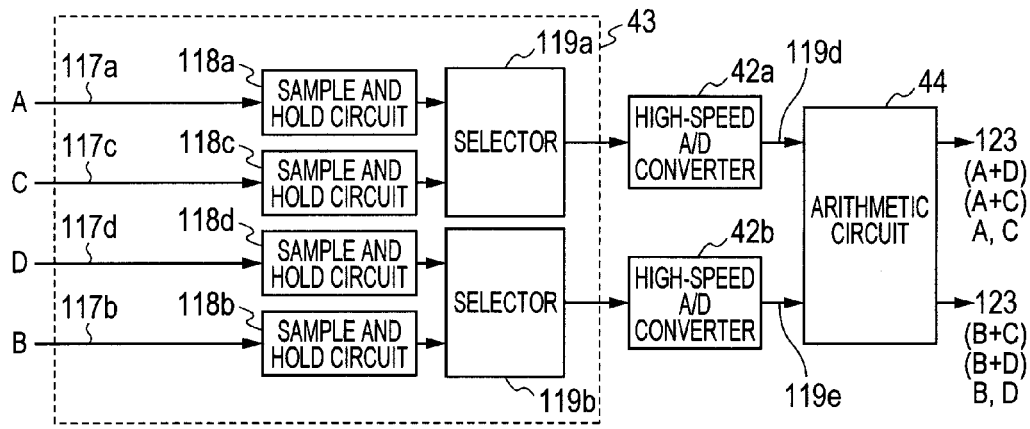
FIG. 16 is a diagram showing the configuration of the preprocessing circuit 43 included in the semiconductor integrated circuit LSI according to a third embodiment of the invention shown in FIG. 12.

FIG. 16 is a diagram showing the configuration of the preprocessing circuit 43 included in the semiconductor integrated circuit LSI according to the third embodiment of the invention illustrated in FIG. 12.

As shown in FIG. 16, the preprocessing circuit 43 includes the four sample and hold circuits 118*a*, 118*b*, 118*c*, and 118*d* and the two selectors 119*a* and 119*b*. An output signal A of the offset cancel amplifier 12*a* is supplied to the input terminal 117*a* of the sample and hold circuit 118*a*, the output signal B of the offset cancel amplifier 12*b* is supplied to the input terminal 117b of the sample and hold circuit 118b, the output signal C of the offset cancel amplifier 12c is supplied to the input terminal 117c of the sample and hold circuit 118c, and the output signal D of the offset cancel amplifier 12d is supplied to the input terminal 117d of the sample and hold circuit 118d.

Figure 17:
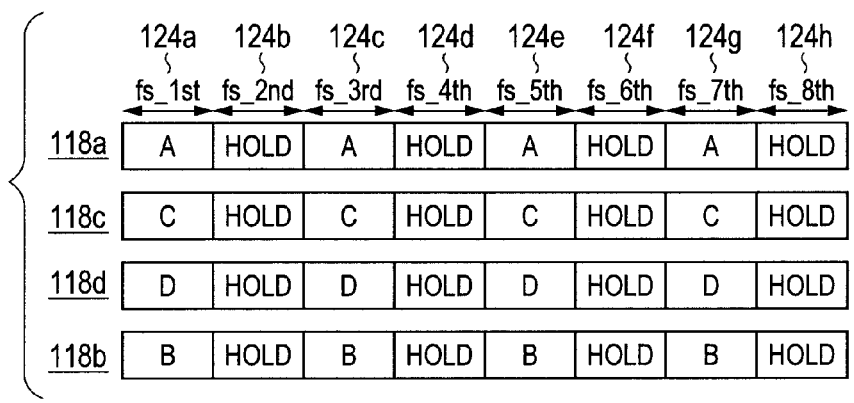
FIG. 17 is a diagram for explaining the operations of the four sample and hold circuits 118a, 118b, 118c, and 118d in the preprocessing circuit 43 shown in FIG. 16.

FIG. 17 is a diagram for explaining the operations of the four sample and hold circuits 118a, 118b, 118c, and 118d in the preprocessing circuit 43 shown in FIG. 16.

As shown in FIG. 17, at odd-numbered operation timings 124a, 124c, 124e, and 124g in the time series, the four sample and hold circuits 118a, 118c, 118d, and 118b execute the sampling operation. At even-numbered operation timings 124b, 124d, 124f, and 124h in the time series, the four sample and hold circuits 118a, 118c, 118d, and 118b execute the holding operation.

As a result, as shown in FIG. 17, at the odd-numbered operation timings 124a, 124c, 124e, and 124g in the time series, the input signals A and B in the sample period of the two sample and hold circuits 118a and 118b are output. At the even-numbered operation timings 124b, 124d, 124f, and 124h, in the time series, the hold signals C and D sampled at the odd-numbered operation timings 124a, 124c, 124e, and 124g in the time series of the two sample and hold circuits 118c and 118d are output.

FIG. 18 is a diagram for explaining the operations of the two selectors 119a and 119b, the two high-speed A/D converters 42a and 42b, and the arithmetic circuit 44 in the preprocessing circuit 43 shown in FIG. 16.

As shown in FIG. 18, at odd-numbered operation timings 124a, 124c, 124e, and 124g in the time series, the two selectors 119a and 119b select the input signals A and B in the sample period, which are output from the upper and lower two sample and hold circuits 118a and 118b, and the input signals A and B are converted to sample digital signals by the two high-speed A/D converters 42a and 42b, and the two sample digital signals are supplied to the two input terminals of the arithmetic circuit 44.

As shown in FIG. 18, at the even-numbered operation timings 124b, 124d, 124f, and 124h in the time series, the two selectors 119a and 119b select hold signals C and D in the hold period, which are output from the two sample and hold circuits 118c and 118d in the center, and the hold signals C and D are converted to hold digital signals by the two high-speed A/D converters 42a and 42b, and the two hold digital signals are supplied to the two input terminals of the arithmetic circuit 44.

As a result, as shown in FIG. 18, the two sample digital signals A and B supplied in the sample period at the odd-numbered operation timings 124a, 124c, 124e, and 124g in the time series, and the hold signals C and D supplied in the hold period at the even-numbered operation timings 124b, 124d, 124f, and 124h in the time series are added by the arithmetic circuit 44.

As a result, as shown in FIG. 18, at the former four operation timings 124a to 124d, the first digital addition output signal (A+C) and the second digital addition output signal (B+D) are output from the two output terminals of the arithmetic circuit 44. At the latter four operation timings 124e to 124h, the third digital addition output signal (A+D) and the fourth digital addition output signal (B+C) are output from the two output terminals of the arithmetic circuit 44.

Figure 4:
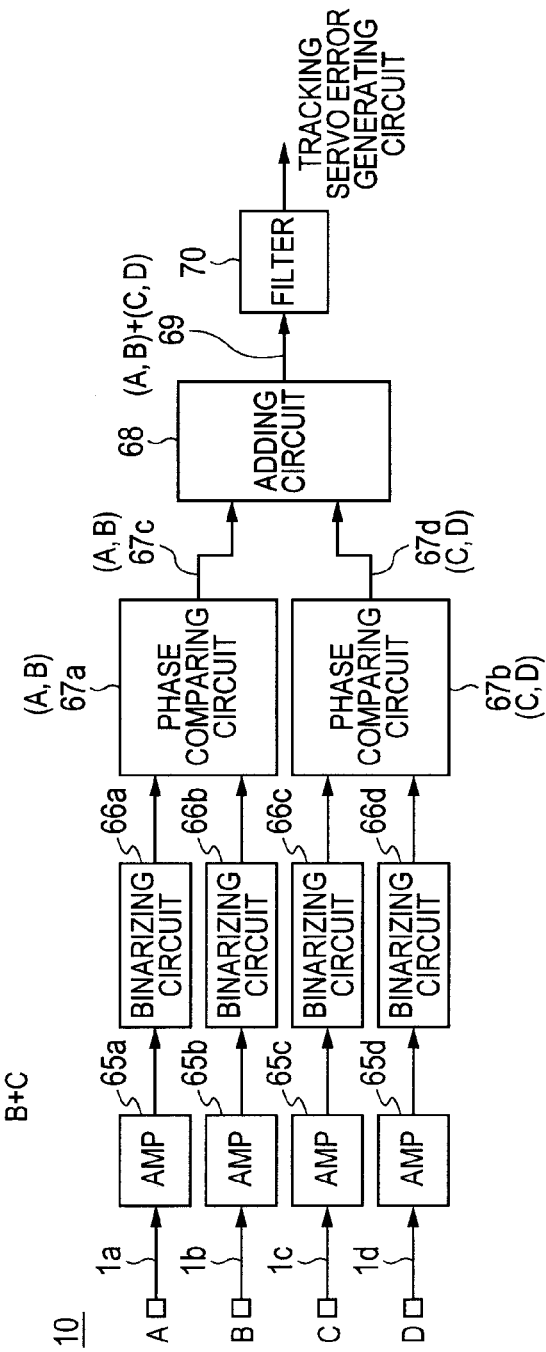
FIG. 4 is a diagram showing the configuration of a DPD signal generating circuit 10 of a differential phase detection (DPD) method included in the semiconductor integrated circuit LSI examined by the inventors of the present invention prior to, the present invention illustrated in FIG. 1.
Figure 5:
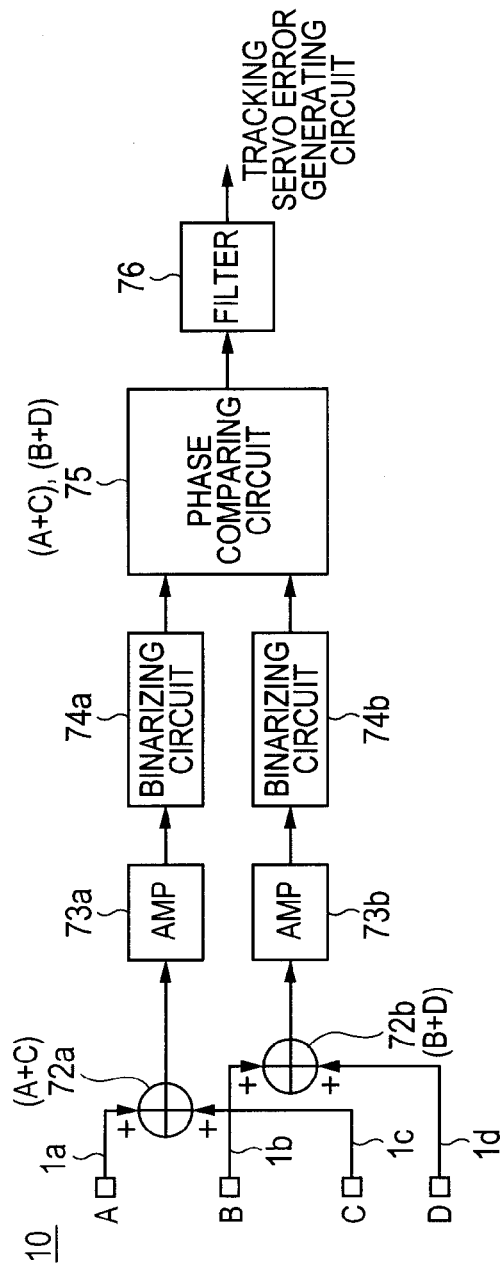
FIG. 5 is a diagram showing the configuration of another DPD signal generating circuit 10 of the differential phase detection (DPD) method included in the semiconductor integrated circuit LSI examined by the inventors of the present invention prior to the present invention illustrated in FIG. 1.
Figure 6:
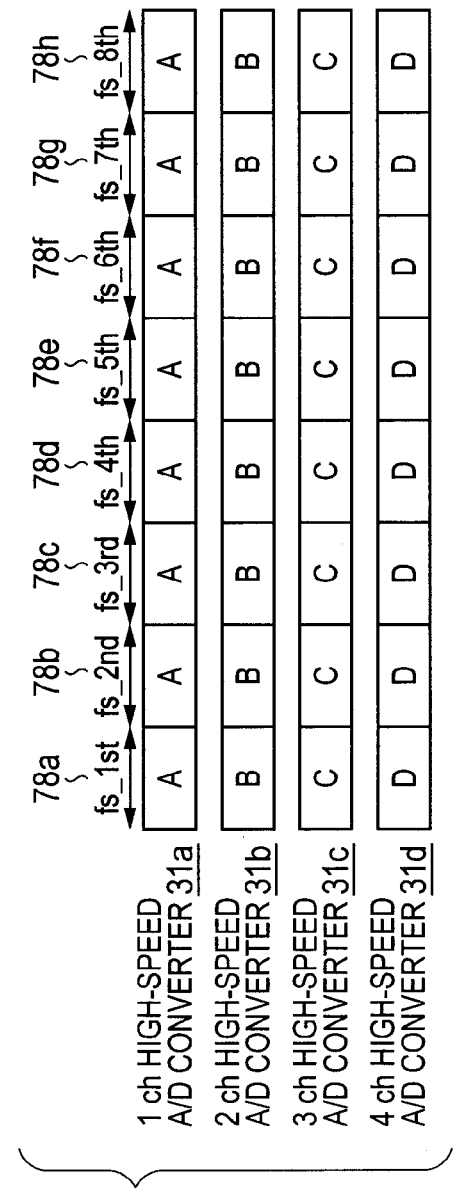
FIG. 6 is a diagram for explaining the operation of A/D conversion parallel process performed by four A/D converters 31a to 31d included in the semiconductor integrated circuit LSI examined by the inventors of the present invention prior to the present invention shown in FIG. 2.

Further, according to another embodiment, at the operation timings 124a to 124h, the input signals A, B, C, and D are output directly to the DPD signal generating circuit 34 in FIG. 12 without outputting arithmetic output signals from the two output terminals of the arithmetic circuit 44. By making the DPD signal generating circuit 34 in FIG. 12 execute processes similar to those in FIG. 4, a DPD signal expressed by (A,B)+(C,D) can be also generated.

Therefore, in a manner similar to the semiconductor integrated circuit LSI according to the first embodiment of the invention of FIG. 7, the first digital addition output signal (A+C), the second digital addition output signal (B+D), the third digital addition output signal (A+D), and the fourth digital addition output signal (B+C) which are output by the preprocessing circuit 43, the two high-speed A/D converters 42a and 42b, and the arithmetic circuit 44 included in the semiconductor integrated circuit LSI according to the third embodiment of the invention of FIG. 12 are used for digital addition operation of (A+C)+(B+D) or (A+D)+(B+C) in the amplitude correcting circuit 32, used for digital operation (A+D)−(B+C) in the wobble signal generating circuit 33, used for generation of the digital phase comparison signals (A+C), (B+D) in the DPD signal generating circuit 34, and used for detection of a ROM mark by execution of the digital operation (A+D)−(B+C) in the wobble signal generating circuit 33.

According to further another embodiment, the first digital addition output signal (A+C), the second digital addition output signal (B+D), and the third digital addition output signal (A+D) which are output from the arithmetic circuit 44 in the semiconductor integrated circuit LSI according to the third embodiment of the invention of FIG. 12 and the input signals A, B, C, and D directly output without being computed in the arithmetic circuit 44 can be used for digital addition operation of (A+C)+(B+D) in the amplitude correcting circuit 32, digital operation (A+D)−(B+C) in the wobble signal generating circuit 33, and computation of the digital phase comparison signal (A,B)+(C,D) in the DPD signal generating circuit 34, and can be also used for detection of a ROM mark by execution of the digital operation (A+D)−(B+C) in the wobble signal generating circuit 33.

The invention achieved by the inventors of the present invention has been concretely described on the basis of the various embodiments. However, obviously, the invention is not limited to the embodiments but may be variously modified without departing from the gist of the invention.

For example, the semiconductor integrated circuit according to the invention is not limited only to a monolithic semiconductor integrated circuit such as the semiconductor integrated circuits LSI according to the first and second embodiments of the invention. Obviously, the semiconductor integrated circuit may be applied to a hybrid semiconductor integrated circuit such as a system-in package (Sip) in which a semiconductor chip of the semiconductor integrated circuit LSI and a thread motor driving circuit, a semiconductor chip of a focus control driving circuit, and a semiconductor chip of a spindle motor driving circuit are sealed in a single plastic sealing resin.

What is claimed is:

1. A semiconductor integrated circuit which is mounted on an optical disk device having an optical pickup,
the semiconductor integrated circuit for receiving a first light reception output signal, a second light reception output signal, a third light reception output signal, and a fourth light reception output signal from four light receiving regions of a light receiving element of the optical pickup,
the semiconductor integrated circuit comprising:
a wobble signal generating circuit configured to detect a wobble in a recordable disk which is inserted in the optical disk device;

a differential phase detecting method signal generating circuit for tracking an unrecordable disk which is inserted in the optical disk device; and an operation circuit comprising two A/D converters and an arithmetic circuit, wherein when a first operation mode is set, the operation circuit generates a first digital addition output signal based on the first and third light reception output signals and a second digital addition output signal based on the second and fourth light reception output signals by using output signals selectively supplied to the two A/D converters and the operation of the arithmetic circuit, wherein when a second operation mode is set, the operation circuit generates a third digital addition output signal based on the first and fourth light reception output signals and a fourth digital addition output signal based on the second and third light reception output signals by using output signals selectively supplied to the two A/D converters and the operation of the arithmetic circuit, wherein the wobble signal generating circuit generates a digital wobble signal by execution of digital subtraction operation using the third and fourth digital addition output signals generated in the second operation mode, and wherein the differential phase detection method signal generating circuit generates a digital phase comparison signal using the first and second digital addition output signals generated in the first operation mode.

2. The semiconductor integrated circuit according to claim 1, further comprising an amplitude correction detecting circuit configured to generation a detection signal indicative of the existence of a scratch in the recordable disk and a scratch in the unrecordable disk, by executing both of first digital addition operation using the first and second addition output signals generated on the basis of the arithmetic operation of the arithmetic circuit which is set in the first operation mode and second digital addition operation using the third and fourth addition output signals generated on the basis of the arithmetic operation of the arithmetic circuit which is set in the second operation mode.

3. The semiconductor integrated circuit according to claim 2, wherein in the case where a read-only BD-ROM disk is inserted in the optical disk device, in order to detect a ROM mark recorded on the BD-ROM disk, generation of the digital phase comparison signal by the differential phase detection method signal generating circuit using the first and second addition output signals generated on the basis of the arithmetic operation of the arithmetic circuit which is set in the first operation mode for tracking error signal detection on the BD-ROM disk, and detection of the ROM mark by executing the digital subtraction operation by the wobble signal generating circuit using the third and fourth addition output signals generated on the basis of the arithmetic operation of the arithmetic circuit which is set in the second operation mode are alternately executed.

4. The semiconductor integrated circuit according to claim 3, wherein when the arithmetic circuit is set in the first operation mode, the arithmetic circuit generates the first addition output signal by first analog addition of the first and third light reception output signals and the second addition output signal by second analog addition of the second and fourth light reception output signals, wherein when the arithmetic circuit is set in the second operation mode, the arithmetic circuit generates the third addition output signal by third analog addition of the first and fourth light reception output signals and the fourth addition output signal by fourth analog addition of the second and third light reception output signals, wherein in the first operation mode, the first and second addition output signals generated from the arithmetic circuit are supplied to analog input terminals of the two A/D converters, first and second digital addition output signals generated at digital output terminals of the two A/D converters are supplied to digital input terminals of the wobble signal generating circuit, the differential phase detection method signal generating circuit, and the amplitude correction detecting circuit, and wherein in the second operation mode, the third and fourth addition output signals generated from the arithmetic circuit are supplied to the analog input terminals of the two A/D converters, third and fourth digital addition output signals generated at the digital output terminals of the two A/D converters are supplied to the digital input terminals of the wobble signal generating circuit, the differential phase detection method signal generating circuit, and the amplitude correction detecting circuit.

5. The semiconductor integrated circuit according to claim 4, wherein the arithmetic circuit includes: a first selector to which the first addition output signal generated by the arithmetic circuit which is set in the first operation mode and the third addition output signal generated by the arithmetic circuit which is set in the second operation mode can be supplied; and a second selector to which the second addition output signal generated by the arithmetic circuit which is set in the first operation mode and the fourth addition output signal generated by the arithmetic circuit which is set in the second operation mode can be supplied, and wherein output terminals of the first and second selectors are coupled to the analog input terminals of the two A/D converters.

6. The semiconductor integrated circuit according to claim 5, further comprising a central processing unit configured to discriminate the recordable disk and the unrecordable disk to be inserted in the optical disk device from each other, wherein in the case where the central processing unit determines that a disk inserted in the optical disk device is the unrecordable disk, the central processing unit sets the arithmetic circuit in the first operation mode, and the differential phase detection method signal generating circuit generates the digital phase comparison signal by using the first and second addition output signals generated on the basis of the arithmetic operation of the arithmetic circuit which is set in the first operation mode, and wherein in the case where the central processing unit determines that a disk inserted in the optical disk device is the recordable disk, the central processing unit sets the arithmetic circuit in the second operation mode, and the wobble signal generating circuit generates the digital wobble signal by the execution of the digital subtraction operation using the third and fourth addition output signals generated on the basis of the arithmetic operation of the arithmetic circuit which is set in the second operation mode.

7. The semiconductor integrated circuit according to claim 3, wherein when the first or second operation mode is set, the first light reception output signal and the third or fourth light reception output signal are alternately supplied to an input terminal of one of the two A/D converters, when the first or second operation mode is set, the second light reception output signal and the fourth or third light reception output signal are alternately supplied to an input terminal of the other one of the two A/D converters, and wherein the arithmetic circuit adds a first light reception digital signal and a third or fourth light reception digital signal generated alternately from an output terminal of the one of the A/D converters, outputs a first or third digital addition output signal, adds a second light reception digital signal and a fourth or third light reception digital signal generated alternately from an output terminal of the other A/D converter, and outputs a second or fourth digital addition output signal.

8. The semiconductor integrated circuit according to claim 7, further comprising a preprocessing circuit coupled to the input terminal of the one of the A/D converters and the input terminal of the other A/D converter, wherein the preprocessing circuit includes first to fourth sample and hold circuits and first and second selectors, wherein an output terminal of the first sample and hold circuit and an output terminal of the third sample and hold circuit are coupled to two input terminals of the first selector, an output terminal of the second sample and hold circuit and an output terminal of the fourth sample and hold circuit are coupled to two input terminals of the second selector, wherein an output terminal of the first selector is coupled to the input terminal of the one of the A/D converters, an output terminal of the second selector is coupled to the input terminal of the other A/D converter, wherein in the first operation mode, the first, second, third, and fourth light reception output signals are supplied to the input terminals of the first, second, third, and fourth sample and hold circuits, respectively, wherein in a sample period in the first operation mode, a first light reception sample signal of the output terminal of the first sample and hold circuit and a second light reception sample signal of the output terminal of the second sample and hold circuit are supplied to the input terminal of the one of the A/D converters and the input terminal of the other A/D converter via one of the input terminals and the output terminal of the first selector and one of the input terminals and the output terminal of the second selector, respectively, wherein in a hold period in the first operation mode, a third light reception hold signal of the output terminal of the third sample and hold circuit and a fourth light reception hold signal of the output terminal of the fourth sample and hold circuit are supplied to the input terminal of the one of the A/D converters and the input terminal of the other A/D converter via the other input terminal and the output terminal of the first selector and the other input terminal and the output terminal of the second selector, respectively, wherein in the second operation mode, the first, second, third, and fourth light reception output signals are supplied to the input terminals of the first, second, fourth, and third sample and hold circuits, respectively, wherein in a sample period in the second operation mode, the first light reception sample signal of the output terminal of the first sample and hold circuit and the second light reception sample signal of the output terminal of the second sample and hold circuit are supplied to the input terminal of the one of the A/D converters and the input terminal of the other A/D converter via the one of the input terminals and the output terminal of the first selector and the one of the input terminals and the output terminal of the second selector, respectively, and wherein in a hold period in the second operation mode, the fourth light reception hold signal of the output terminal of the fourth sample and hold circuit and the third light reception hold signal of the output terminal of the third sample and hold circuit are supplied to the input terminal of the one of the A/D converters and the input terminal of the other A/D converter via the other input terminal and the output terminal of the first selector and the other input terminal and the output terminal of the second selector, respectively.

9. The semiconductor integrated circuit according to claim 8, further comprising a central processing unit configured to discriminate the recordable disk and the unrecordable disk to be inserted in the optical disk device from each other, wherein in the case where the central processing unit determines that a disk inserted in the optical disk device is the unrecordable disk, the central processing unit sets the arithmetic circuit in the first operation mode, and the differential phase detection method signal generating circuit generates the digital phase comparison signal by using the first and second addition output signals generated on the basis of the arithmetic operation of the arithmetic circuit which is set in the first operation mode, and wherein in the case where the central processing unit determines that a disk inserted in the optical disk device is the recordable disk, the central processing unit sets the arithmetic circuit in the second operation mode, and the wobble signal generating circuit generates the digital wobble signal by the execution of the digital subtraction operation using the third and fourth addition output signals generated on the basis of the arithmetic operation of the arithmetic circuit which is set in the second operation mode.

10. The semiconductor integrated circuit according to claim 3, wherein when the first or second operation mode is set, the first and third light reception output signals are alternately supplied to an input terminal of one of the two A/D converters, and when the first or second operation mode is set, the second and fourth light reception output signals are alternately supplied to an input terminal of the other one of the two A/D converters, and wherein the arithmetic circuit adds a first light reception digital signal and a third light reception digital signal generated from an output terminal of the one of the A/D converters or a fourth light reception digital signal generated from an output terminal of the other A/D converter, outputs a first or third digital addition output signal, or directly outputs a first light reception digital signal and a third or fourth light reception digital signal without adding the first light reception signal and a third or fourth light reception digital signal, adds a second light reception digital signal and a fourth light reception digital signal generated from an output terminal of the other A/D converter or a third light reception digital signal generated from an output terminal of the one of the A/D converters, and outputs a second or fourth digital addition output signal, or without adding a second light reception digital signal and a fourth light reception digital signal or a third light reception digital signal, the second light reception digital signal and the fourth light reception digital signal or the third light reception digital signal are directly output.

11. The semiconductor integrated circuit according to claim 10, further comprising a preprocessing circuit coupled to the input terminal of the one of the A/D converters and the input terminal of the other A/D converter, wherein the preprocessing circuit includes first to fourth sample and hold circuits and first and second selectors, wherein an output terminal of the first sample and hold circuit and an output terminal of the third sample and hold circuit are coupled to two input terminals of the first selector, an output terminal of the second sample and hold circuit and an output terminal of the fourth sample and hold circuit are coupled to two input terminals of the second selector, wherein an output terminal of the first selector is coupled to the input terminal of the one of the A/D converters, an output terminal of the second selector is coupled to the input terminal of the other A/D converter, wherein in the first operation mode, the first, second, third, and fourth light reception output signals are supplied to the input terminals of the first, second, third, and fourth sample and hold circuits, respectively, wherein in a sample period in the first operation mode, a first light reception sample signal of the output terminal of the first sample and hold circuit and a second light reception sample signal of the output terminal of the second sample and hold circuit are supplied to the input terminal of the one of the A/D converters and the input terminal of the other A/D converter via one of the input terminals and the output terminal of the first selector and one of the input terminals and the output terminal of the second selector, respectively, wherein in a hold period in the first operation mode, a third light reception hold signal of the output terminal of the first sample and hold circuit and a fourth light reception hold signal of the output terminal of the second sample and hold circuit are supplied to the input terminal of the one of the A/D converters and the input terminal of the other A/D converter via the other input terminal and the output terminal of the first selector and the other input terminal and the output terminal of the second selector, respectively, wherein in the second operation mode, the first, second, third, and fourth light reception output signals are supplied to the input terminals of the first, second, third, and fourth sample and hold circuits, respectively, wherein in a sample period in the second operation mode, the first light reception sample signal of the output terminal of the first sample and hold circuit and the second light reception sample signal of the output terminal of the second sample and hold circuit are supplied to the input terminal of the one of the A/D converters and the input terminal of the other A/D converter via the one of the input terminals and the output terminal of the first selector and the one of the input terminals and the output terminal of the second selector, respectively, and wherein in a hold period in the second operation mode, a third light reception hold signal of the output terminal of the first sample and hold circuit and a fourth light reception hold signal of the output terminal of the second sample and hold circuit are supplied to the input terminal of the one of the A/D converters and the input terminal of the other A/D converter via the other input terminal and the output terminal of the first selector and the other input terminal and the output terminal of the second selector, respectively.

12. The semiconductor integrated circuit according to claim 10, further comprising a central processing unit configured to discriminate the recordable disk and the unrecordable disk to be inserted in the optical disk device from each other, wherein in the case where the central processing unit determines that a disk inserted in the optical disk device is the unrecordable disk, the central processing unit sets the arithmetic circuit in the first operation mode, and the differential phase detection method signal generating circuit generates the digital phase comparison signal by using the first and second addition output signals generated on the basis of the arithmetic operation of the arithmetic circuit which is set in the first operation mode, or in the case where the central processing unit determines that a disk inserted in the optical disk device is the unrecordable disk, the central processing unit sets the arithmetic circuit in the first operation mode, and outputs first to fourth light reception hold signals at the output terminal to the differential phase detection method signal generating circuit on the basis of the arithmetic operation of the arithmetic circuit which is set in the first operation mode, and wherein in the case where the central processing unit determines that a disk inserted in the optical disk device is the recordable disk, the central processing unit sets the arithmetic circuit in the second operation mode, and the wobble signal generating circuit generates the digital wobble signal by the execution of the digital subtraction operation using the third and fourth addition output signals generated on the basis of the arithmetic operation of the arithmetic circuit which is set in the second operation mode.

13. An optical disk device having an optical pickup and a semiconductor integrated circuit, the semiconductor integrated circuit for receiving a first light reception output signal, a second light reception output signal, a third light reception output signal, and a fourth light reception output signal from four light receiving regions of a light receiving element of the optical pickup, the semiconductor integrated circuit comprising:

a wobble signal generating circuit configured to detect a wobble in a recordable disk which is inserted in the optical disk device;

a differential phase detecting method signal generating circuit for tracking an unrecordable disk which is inserted in the optical disk device; and an operation circuit comprising two A/D converters and an arithmetic circuit, wherein when a first operation mode is set, the operation circuit generates a first digital addition output signal based on the first and third light reception output signals and a second digital addition output signal based on the second and fourth light reception output signals by using output signals selectively supplied to the two A/D converters and the operation of the arithmetic circuit, wherein when a second operation mode is set, the operation circuit generates a third digital addition output signal based on the first and fourth light reception output signals and a fourth digital addition output signal based on the second and third light reception output signals by using output signals selectively supplied to the two A/D converters and the operation of the arithmetic circuit, wherein the wobble signal generating circuit generates a digital wobble signal by execution of digital subtraction operation using the third and fourth digital addition output signals generated in the second operation mode, and wherein the differential phase detection method signal generating circuit generates a digital phase comparison signal using the first and second digital addition output signals generated in the first operation mode.

14. The optical disk device according to claim 13, wherein the semiconductor integrated circuit further comprises an amplitude correction detecting circuit configured to generate a detection signal indicative of the existence of a scratch in the recordable disk and a scratch in the unrecordable disk, by executing both of first digital addition operation using the first and second addition output signals generated on the basis of the arithmetic operation of the arithmetic circuit which is set in the first operation mode and second digital addition operation using the third and fourth addition output signals generated on the basis of the arithmetic operation of the arithmetic circuit which is set in the second operation mode.

15. The optical disk device according to claim 14, wherein in the case where a read-only BD-ROM disk is inserted in the optical disk device, in the semiconductor integrated circuit, in order to detect a ROM mark recorded on the BD-ROM disk, generation of the digital phase comparison signal by the differential phase detection method signal generating circuit using the first and second addition output signals generated on the basis of the arithmetic operation of the arithmetic circuit which is set in the first operation mode for tracking error signal detection on the BD-ROM disk, and detection of the ROM mark by executing the digital subtraction operation by the wobble signal generating circuit using the third and fourth addition output signals generated on the basis of the arithmetic operation of the arithmetic circuit which is set in the second operation mode are alternately executed.

16. The optical disk device according to claim 15,
wherein when the arithmetic circuit is set in the first operation mode, the arithmetic circuit generates the first addition output signal by first analog addition of the first and third light reception output signals and the second addition output signal by second analog addition of the second and fourth light reception output signals,
wherein when the arithmetic circuit is set in the second operation mode, the arithmetic circuit generates the third addition output signal by third analog addition of the first and fourth light reception output signals and the fourth addition output signal by fourth analog addition of the second and third light reception output signals,
wherein in the first operation mode, the first and second addition output signals generated from the arithmetic circuit are supplied to analog input terminals of the two A/D converters, first and second digital addition output signals generated at digital output terminals of the two A/D converters are supplied to digital input terminals of the wobble signal generating circuit, the differential phase detection method signal generating circuit, and the amplitude correction detecting circuit, and
wherein in the second operation mode, the third and fourth addition output signals generated from the arithmetic circuit are supplied to the analog input terminals of the two A/D converters, third and fourth digital addition output signals generated at the digital output terminals of the two A/D converters are supplied to the digital input terminals of the wobble signal generating circuit, the differential phase detection method signal generating circuit, and the amplitude correction detecting circuit.

17. The optical disk device according to claim 16,
wherein the arithmetic circuit includes a first selector to which the first addition output signal generated by the arithmetic circuit which is set in the first operation mode and the third addition output signal generated by the arithmetic circuit which is set in the second operation mode can be supplied and a second selector to which the second addition output signal generated by the arithmetic circuit which is set in the first operation mode and the fourth addition output signal generated by the arithmetic circuit which is set in the second operation mode can be supplied, and
wherein output terminals of the first and second selectors are coupled to the analog input terminals of the two A/D converters.

18. The optical disk device according to claim 17,
wherein the semiconductor integrated circuit further comprises: a central processing unit configured to discriminate the recordable disk and the unrecordable disk to be inserted in the optical disk device from each other,
wherein in the case where the central processing unit determines that a disk inserted in the optical disk device is the unrecordable disk, the central processing unit sets the arithmetic circuit in the first operation mode, and the differential phase detection method signal generating circuit generates the digital phase comparison signal by using the first and second addition output signals generated on the basis of the arithmetic operation of the arithmetic circuit which is set in the first operation mode, and
wherein in the case where the central processing unit determines that a disk inserted in the optical disk device is the recordable disk, the central processing unit sets the arithmetic circuit in the second operation mode, and the wobble signal generating circuit generates the digital wobble signal by the execution of the digital subtraction operation using the third and fourth addition output signals generated on the basis of the arithmetic operation of the arithmetic circuit which is set in the second operation mode.

19. The optical disk device according to claim 15,
wherein when the first or second operation mode is set, the first light reception output signal and the third or fourth light reception output signal are alternately supplied to an input terminal of one of the two A/D converters, when the first or second operation mode is set, the second light reception output signal and the fourth or third light reception output signal are alternately supplied to an input terminal of the other one of the two A/D converters, and
wherein the arithmetic circuit adds a first light reception digital signal and a third or fourth light reception digital signal generated alternately from an output terminal of the one of the A/D converters, outputs a first or third digital addition output signal, adds a second light reception digital signal and a fourth or third light reception digital signal generated alternately from an output terminal of the other A/D converter, and outputs a second or fourth digital addition output signal.

20. The optical disk device according to claim 19,
wherein the semiconductor integrated circuit further comprises a preprocessing circuit coupled to the input terminal of the one of the A/D converters and the input terminal of the other A/D converter,
wherein the preprocessing circuit includes first to fourth sample and hold circuits and first and second selectors,
wherein an output terminal of the first sample and hold circuit and an output terminal of the third sample and hold circuit are coupled to two input terminals of the first selector, an output terminal of the second sample and hold circuit and an output terminal of the fourth sample and hold circuit are coupled to two input terminals of the second selector, wherein an output terminal of the first selector is coupled to the input terminal of the one of the A/D converters, and an output terminal of the second selector is coupled to the input terminal of the other A/D converter, wherein in the first operation mode, the first, second, third, and fourth light reception output signals are supplied to the input terminals of the first, second, third, and fourth sample and hold circuits, respectively, wherein in a sample period in the first operation mode, a first light reception sample signal of the output terminal of the first sample and hold circuit and a second light reception sample signal of the output terminal of the second sample and hold circuit are supplied to the input terminal of the one of the A/D converters and the input terminal of the other A/D converter via one of the input terminals and the output terminal of the first selector and one of the input terminals and the output terminal of the second selector, respectively, wherein in a hold period in the first operation mode, a third light reception hold signal of the output terminal of the third sample and hold circuit and a fourth light reception hold signal of the output terminal of the fourth sample and hold circuit are supplied to the input terminal of the one of the A/D converters and the input terminal of the other A/D converter via the other input terminal and the output terminal of the first selector and the other input terminal and the output terminal of the second selector, respectively, wherein in the second operation mode, the first, second, third, and fourth light reception output signals are supplied to the input terminals of the first, second, fourth, and third sample and hold circuits, respectively, wherein in a sample period in the second operation mode, the first light reception sample signal of the output terminal of the first sample and hold circuit and the second light reception sample signal of the output terminal of the second sample and hold circuit are supplied to the input terminal of the one of the A/D converters and the input terminal of the other A/D converter via the one of the input terminals and the output terminal of the first selector and the one of the input terminals and the output terminal of the second selector, respectively, and wherein in a hold period in the second operation mode, the fourth light reception hold signal of the output terminal of the fourth sample and hold circuit and the third light reception hold signal of the output terminal of the third sample and hold circuit are supplied to the input terminal of the one of the A/D converters and the input terminal of the other A/D converter via the other input terminal and the output terminal of the first selector and the other input terminal and the output terminal of the second selector, respectively.

\* \* \* \* \*